United States Patent
Rupnik et al.

(10) Patent No.: US 11,164,471 B1
(45) Date of Patent: Nov. 2, 2021

(54) SYSTEM FOR PREVIEWING VERTICAL SPEED GUIDANCE FOLLOWING AN AIR TRAFFIC CONFLICT ALERT

(71) Applicant: The Boeing Company, Chicago, IL (US)

(72) Inventors: Brian K. Rupnik, Lake Stevens, WA (US); Patrick J. Moran, Mukilteo, WA (US); Sean J. Flannigan, Seattle, WA (US); Kirk A. Vining, Seattle, WA (US); Kerry D. Smith, Redmond, WA (US); Robert J. Myers, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 16/593,777

(22) Filed: Oct. 4, 2019

(51) Int. Cl.
  *G08G 5/04* (2006.01)
  *G05D 1/00* (2006.01)
  *B64D 43/00* (2006.01)
  *G08G 5/00* (2006.01)

(52) U.S. Cl.
  CPC ............ *G08G 5/045* (2013.01); *B64D 43/00* (2013.01); *G05D 1/0061* (2013.01); *G05D 1/0088* (2013.01); *G08G 5/0017* (2013.01)

(58) Field of Classification Search
  CPC .... G08G 5/045; G08G 5/0017; G05D 1/0061; G05D 1/0088; B64D 43/00
  USPC ........................................................... 701/3
  See application file for complete search history.

(56) References Cited

U.S. PATENT DOCUMENTS

| | | | |
|---|---|---|---|
| 5,248,968 A | 9/1993 | Kelly et al. | |
| 5,566,074 A * | 10/1996 | Hammer | G05D 1/0808 701/301 |
| 8,725,401 B2 | 5/2014 | Daveze et al. | |
| 8,786,467 B2 | 7/2014 | Clark et al. | |
| 8,989,998 B2 | 3/2015 | Le et al. | |
| 9,418,564 B2 | 8/2016 | Claybrough et al. | |
| 9,471,176 B2 | 10/2016 | Nikolic et al. | |
| 9,646,504 B2 | 5/2017 | Shafaat et al. | |
| 10,192,453 B2 | 1/2019 | Khatwa et al. | |
| 2002/0075171 A1 * | 6/2002 | Kuntman | G01S 13/933 340/961 |
| 2016/0318446 A1 * | 11/2016 | Van Steenkist | G08G 5/045 |
| 2019/0114932 A1 * | 4/2019 | Khatwa | G08G 5/045 |
| 2019/0189017 A1 * | 6/2019 | Nicholls | G08G 5/0078 |
| 2020/0258405 A1 * | 8/2020 | Fern | G08G 5/0013 |

* cited by examiner

*Primary Examiner* — Muhammad Shafi
(74) *Attorney, Agent, or Firm* — Ostrager Chong Flaherty & Broitman P.C.

(57) ABSTRACT

Systems and methods for enabling a pilot to select an automated response to an air traffic conflict alert. In accordance with one embodiment, the system includes updated displays, an updated autoflight mode control panel and high-level software logic in the autopilot, flight director and autothrottle to provide an expedited response. A mode control switch may be optionally included. In accordance with an additional option, the system may be configured to operate in a fully automated state in which the system responds automatically to the air traffic conflict event without needing the pilot to first accept the automated response before its execution.

26 Claims, 14 Drawing Sheets

SYSTEM FOR PREVIEWING VERTICAL SPEED GUIDANCE FOLLOWING AN AIR TRAFFIC CONFLICT ALERT

BACKGROUND

The present disclosure relates to avionics systems and, more particularly, to air traffic alert and collision avoidance systems.

Many modern aircraft are equipped with a traffic collision avoidance system (TCAS) which monitors the surrounding airspace for similarly TCAS-equipped aircraft, independent of air traffic control, and issues an alert when a conflict (i.e., a potential collision threat) with another aircraft is identified. (The term "conflict" as used herein is an event in which two aircraft experience a loss of minimum separation. A conflict occurs when the distance between aircraft in flight violates a defining criterion, usually a minimum horizontal and/or minimum vertical separation. These distances define an aircraft's protected zone, a volume of airspace surrounding the aircraft which should not be infringed upon by any other aircraft.) Each TCAS-equipped aircraft interrogates all other aircraft in a specified range, and all other aircraft reply to the interrogations which they receive. The TCAS comprises a processor, a directional antenna mounted on the top of the aircraft, an omnidirectional or directional antenna mounted on the bottom of the aircraft, and a traffic display in the cockpit. The TCAS traffic display may be integrated into the navigation display or some other cockpit display. The TCAS processor builds a three-dimensional map of aircraft in the airspace, incorporating their range, closure rate, altitude and bearing; then the TCAS processor determines if a conflict exists by extrapolating current range and altitude difference to anticipated future values and determining whether another aircraft has entered a protected volume of airspace that surrounds ownship. The extent of the protected volume of airspace will depend on the altitude, groundspeed and heading/track of the intruder aircraft involved in the encounter.

More specifically, the TCAS processor executes a program that performs a conflict detection algorithm. Based on parameters applied by the conflict detection algorithm, the TCAS gives an alert when several conditions occur: (1) Entry by an intruder into a protected airspace (called the Traffic Advisory region) surrounding the ownship causes the TCAS onboard that aircraft to issue a Traffic Advisory (TA). (2) If the opposing traffic is within the protected airspace and the TCAS detects that the heading/track, climb rate, and closure rate of the opposing traffic may cause the time to the closest point of approach to fall below a threshold value, the TCAS issues a Resolution Advisory (RA).

Resolution Advisories are of two types: preventive and corrective. A preventive Resolution Advisory requires the pilot to avoid certain deviations from the current vertical speed (e.g., do not climb or descend while in level flight). A preventive Resolution Advisory does not require the pilot to alter the aircraft's current flight path. A corrective Resolution Advisory requires the pilot to either deviate from current vertical speed (e.g., start to climb or descend while in level flight) or maintain an existing climb or descent rate. The TCAS provides a vertical speed target for the aircraft which is calculated to gain sufficient separation from the intruder aircraft to eliminate the collision threat. This maneuver is typically performed solely in the vertical plane.

Corrective RA events tend to be high workload events which have a history of pilots either incorrectly following the TCAS system commands or being too aggressive in their response. In some products there is no integration between the TCAS system and other aircraft automation and the pilot procedure is to disconnect all automation to follow the TCAS guidance. This can lead to pilot error with respect to following the guidance. In other products the TCAS commands are automatically acted upon by the automation (and the pilot may choose to override). However this can lead to nuisance deviations from the flight path for non-threatening or erroneous TCAS alerts.

SUMMARY

The subject matter disclosed in detail below is directed to systems and methods for enabling a pilot of an aircraft (e.g., an airplane or a helicopter) to preview vertical speed guidance following an air traffic conflict alert (e.g., a TCAS Resolution Advisory). In accordance with one embodiment, the system includes updated displays, an updated autoflight mode control panel and high-level software logic in the autopilot, flight director and autothrottle to provide an expedited response. A mode control switch may be optionally included. In accordance with an additional option, the system may be configured to operate in a fully automated state in which the system responds automatically to the air traffic conflict event without needing the pilot to accept the action first.

Various embodiments of the system proposed herein include one or more of the following features: (1) new crew interfaces to accept the TCAS command to be followed by the automation; (2) crew alerts consistent with existing autopilot annunciations to keep the crew aware of an impending RA action and what the system will do to recover from the RA event (as used herein, the term "annunciation" means a visual or aural indication perceptible to a human); (3) the ability for the autopilot and autothrottle to use gains, limits or targets specific to the collision avoidance maneuver using new interfaces with the TCAS computer; (4) crew interfaces to enable selection of a completely automated mode of operation; and (5) an operator-selectable software option that governs whether the system will respond to a TCAS Resolution Advisory automatically or only upon receipt of pilot authorization (the pilot is not able to alter this setting).

The system and method proposed herein allow the flight crew to selectively employ automation to provide a prompt, smooth, response to an air traffic conflict event such as a TCAS Resolution Advisory event. The ability to select the response enables the flight crew to ignore erroneous or unnecessary commands (e.g., if the target aircraft is in sight and deemed not a threat by the flight crew). In addition, the innovative technology disclosed herein offers safety and pilot workload enhancements for scenarios involving close proximity to other aircraft. Providing the automation enhances safety and reduces workload. Providing the pilot with means for governing the state of the automation allows the pilot to remain engaged with the system during operation.

Although various embodiments of systems and methods for enabling a pilot to preview vertical speed guidance following an air traffic conflict alert are described in some detail later herein, one or more of those embodiments may be characterized by one or more of the following aspects.

One aspect of the subject matter disclosed in detail below is a method for enabling a pilot to preview vertical speed guidance following an air traffic conflict alert, the method comprising: (a) issuing a first air traffic conflict alert; (b) generating a first annunciation that is observable by a pilot and indicates that the first air traffic conflict alert has been issued; (c) generating a second annunciation that indicates a commanded parameter value included in vertical speed guidance for avoiding a collision; (d) receiving an input signal from the pilot indicating that the pilot has accepted the vertical speed guidance; (e) providing the vertical speed guidance in response to receipt of the input signal; and (f) controlling the aircraft to fly a collision avoidance maneuver that follows the vertical speed guidance. In accordance with one embodiment, the input signal authorizes an automated response and step (f) comprises activating autopilot and autothrottle modes to control the aircraft to fly the collision avoidance maneuver in accordance with the vertical speed guidance. In accordance with another embodiment, the input signal selects a flight director mode and step (f) comprises manually controlling the aircraft to fly the collision avoidance maneuver in accordance with vertical speed guidance provided by the flight director.

Another aspect of the subject matter disclosed in detail below is a system onboard an aircraft (e.g., an airplane or a helicopter) for enabling a pilot to preview vertical speed guidance following an air traffic conflict alert, the system comprising: a manually operable switch accessible to a pilot; means for annunciating visual or aural indications which are perceptible to the pilot; and a computer system configured to perform operations comprising: (a) issuing an air traffic conflict alert; (b) activating the means for annunciating to generate a first annunciation that indicates that the air traffic conflict alert has been issued; (c) generating vertical speed guidance for avoiding a collision; (d) activating the means for annunciating to generate a second annunciation that indicates a commanded parameter value included in the vertical speed guidance for avoiding a collision; (e) receiving an input signal from the manually operable switch indicating that the pilot has accepted the vertical speed guidance; and (f) providing the vertical speed guidance in response to receipt of the input signal. In accordance with one embodiment, the input signal authorizes an automated response and the computer system comprises an autopilot and an autothrottle configured to control the aircraft to fly the collision avoidance maneuver in accordance with the vertical speed guidance. In accordance with another embodiment the input signal selects a flight director mode and the computer system comprises a flight director configured to provide vertical speed guidance for enabling the pilot to manually control the aircraft to fly the collision avoidance maneuver.

A further aspect of the subject matter disclosed in detail below is an aircraft (e.g., an airplane or a helicopter) comprising: at least one engine; a plurality of control surfaces; a manually operable switch accessible to a pilot; means for annunciating visual or aural indications which are perceptible to the pilot; and a computer system configured to perform operations comprising: (a) issuing an air traffic conflict alert; (b) activating the means for annunciating to generate a first annunciation that indicates that the air traffic conflict alert has been issued; (c) generating vertical speed guidance for avoiding a collision; (d) activating the means for annunciating to generate a second annunciation that indicates a commanded parameter value included in the vertical speed guidance for avoiding a collision; (e) receiving an input signal from the pilot indicating that the pilot has accepted the vertical speed guidance; and (f) providing the vertical speed guidance in response to receipt of the input signal. In accordance with one embodiment, the input signal authorizes an automated response and the computer system comprises an autopilot and an autothrottle configured to controlling the at least one engine and the control surfaces so that the aircraft performs the collision avoidance maneuver in accordance with the vertical speed guidance. In accordance with another embodiment, the input signal selects a flight director mode and the computer system comprises a flight director configured to provide vertical speed guidance for enabling the pilot to manually control the at least one engine and the control surfaces so that the aircraft performs the collision avoidance maneuver.

Other aspects of systems and methods for enabling a pilot to preview vertical speed guidance following an air traffic conflict alert are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of systems and methods for enabling a pilot to preview vertical speed guidance following an air traffic conflict alert are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
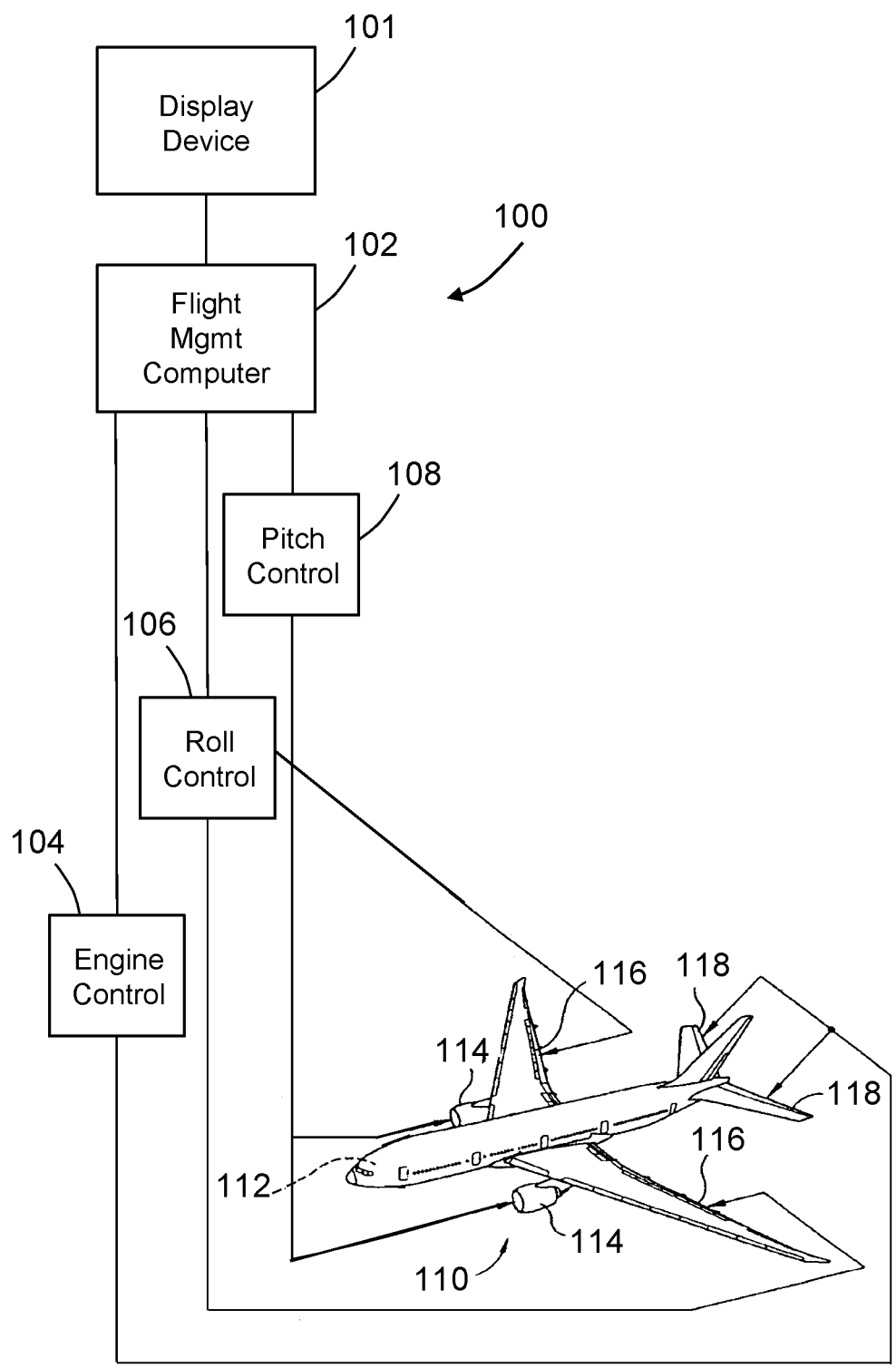
FIG. 1 is a diagram representing an aircraft that has an autoflight system with a display device that presents autoflight information to the pilot.

FIG. 1 is a diagram representing an aircraft 110 that has an autoflight system 100 with a display device 101 that presents autoflight information to the pilot. The autoflight system 100 includes a flight management computer 102 linked to one or more controllers, such as an engine controller or autothrottle 104, a roll controller 106, and a pitch controller 108. The engine controller 104 is operatively coupled to engines 114 of the aircraft 110 to automatically control engine functions, such as engine thrust. The roll controller 106 is operatively coupled to ailerons 116 of the aircraft 110, and the pitch controller 108 is operatively coupled to elevators 118 of the aircraft 110. In some embodiments, the roll controller 106 and pitch controller 108 form respective portions of an integrated autopilot device. In other embodiments, the roll controller 106 and pitch controller 108 are independent. In either case, roll controller 106 automatically controls aircraft roll and pitch controller 108 automatically controls aircraft pitch.

Figure 2:
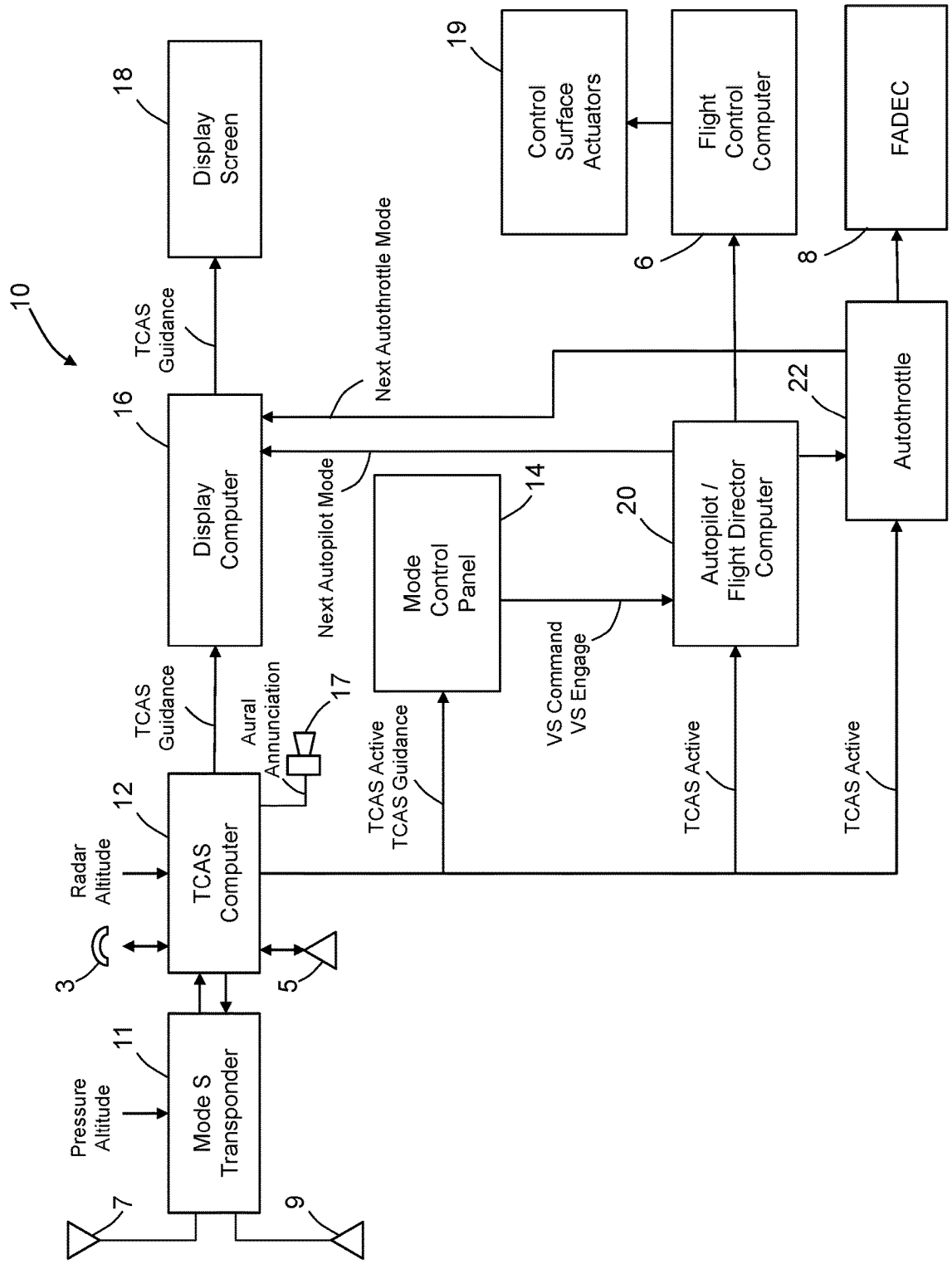
FIG. 2 is a block diagram identifying some components of an automatic flight control system that is configured to control vertical speed in response to receipt of a TCAS Resolution Advisory.

In accordance with some embodiments, the roll controller 106 and pitch controller 108 take the form of a computer system that includes an autopilot/flight director computer (not shown in FIG. 1, but see autopilot/flight director computer 20 in FIG. 2) and one or more flight control computers (not shown in FIG. 1, but see flight control computer 6 in FIG. 2). In such embodiments, the flight management computer 102 provides lateral navigation (LNAV) and vertical navigation (VNAV) guidance signals to the autopilot/flight director computer 20, which validates and acknowledges the guidance signals. The autopilot/flight director computer 20 then provides guidance signals to the flight control computer 6 which activates the aircraft's control surface actuators such that the aircraft is directed to automatically fly the route as selected by the flight management computer 102.

Referring again to FIG. 1, the display device 101 is centrally located in a forward field of view of a pilot on a flight deck 112 of the aircraft 110. The flight management computer 102 is communicatively coupled to the display device 101 to provide the display device 101 with information relating to the operation of the above-described controllers. In addition, the flight management computer 102 may receive instructions for the autoflight system 100 via pilot inputs or from external sources via a datalink. For example, the display device 101 may include one or more input devices configured to receive pilot instructions for controlling the autoflight system 100. In addition, the display device 101 may include one or more display screens configured to provide the pilot with information about how the autoflight system 100 is flying the aircraft 110, such as information related to one or more autoflight modes and/or one or more target flight parameters.

In accordance with some embodiments, the display device 101 includes a mode control panel (not shown in FIG. 1, but see FIG. 5) that interfaces with the flight management computer 102 to control the selection and engagement of automatic flight control modes of operation. These automatic flight control modes of operation include, for example, flight level change (FLCH), vertical navigation (VNAV) and lateral navigation (LNAV). The FLCH mode can automatically manage thrust and speed to climb or descend from one altitude to another. The VNAV mode can provide automatic optimized profile control from initial climb through final approach, including adherence to terminal area procedure speed and altitude constraints. The LNAV mode can provide steering to a preprogrammed route including selected terminal area procedures.

The pilot chooses the available modes that will best accomplish the desired vertical flight profile and lateral routing. In most instances, the pilot plans the flight in advance, both laterally and vertically, and preprograms the LNAV and VNAV modes so that the desired flight path will be followed. While preprogrammed flights are advantageous because they reduce the pilot's burden, particularly during takeoff and landing, in practice, rarely can flights be flown as preplanned. For example, a conflict alert may be issued by an onboard anti-collision system (e.g., a TCAS) during the flight. This alert may force the pilot to manually intervene in order to depart from LNAV and VNAV preprogrammed flight paths and maneuver the aircraft to avoid a collision with an intruder aircraft. The flight management system program includes several modules that override the preprogrammed instructions stored in the memory of the autoflight computer when the modules are engaged. In this manner, the flight management system 102 allows the pilot to manually intervene to change heading, altitude, airspeed or vertical speed. The flight management system 102 automatically returns to fully optimized flight along the preprogrammed profile when the intervention is cancelled.

The term "autoflight mode" as used herein can refer to the particular manner in which the autoflight system 100 is flying the aircraft 110. For example, in various embodiments, autoflight modes may relate to airspeed (e.g., increasing, decreasing, or maintaining airspeed); vertical guidance (e.g., climbing, descending, or maintaining altitude); and/or lateral guidance (e.g., turning or maintaining a heading). These autoflight modes can be represented by conventional flight mode annunciators. In other embodiments, these autoflight modes can be represented by other symbology, including alphanumeric textual shorthands. The term "target flight parameter" as used herein can refer to the particular values of airspeed, altitude, heading, tracks and/or course to which the autoflight system 100 is actually instructed to fly.

For example, the display device 101 may provide the following autoflight information: "DESCEND TO 14000 FT" Here, the autoflight mode "descend" indicates that the autoflight system 100 is instructed to cause the aircraft 110 to descend, and the target flight parameter value indicates that the autoflight system 100 is instructed to cause the aircraft 110 to descend to an altitude of 14000 feet. In other embodiments, the display device 101 may provide the pilot with other types of autoflight system information. Accordingly, the display device 101 may enable the pilot to quickly obtain current autoflight information and, if desired, change autoflight instructions, without having to refer to multiple locations around the flight deck 112.

FIG. 2 is a block diagram identifying some components of an automatic flight control system 10 in accordance with one embodiment. The automatic flight control system 10 is configured to control vertical speed in response to receipt of a TCAS Resolution Advisory. The automatic flight control system 10 includes a TCAS computer 12 that is configured (e.g., programmed) to perform airspace surveillance, intruder tracking, own aircraft altitude tracking, threat detection, RA maneuver determination and selection, and generation of advisories. The TCAS computer 12 uses pressure altitude, radar altitude, and discrete aircraft status inputs from own aircraft to control the collision avoidance logic parameters that determine the protection volume around the TCAS. If the threat aircraft is also equipped with a TCAS, the collision avoidance maneuver will be coordinated with the threat aircraft.

The automatic flight control system 10 further includes a mode S transponder 11 that performs functions to support the ground-based air traffic control system. The mode S transponder 11 is also used to provide air-to-air data exchange between TCAS-equipped aircraft so that coordinated, complementary RAs can be issued when required. The antennas used by TCAS include a directional antenna 3 that is mounted on the top of the aircraft and either an omni-directional or a directional antenna 5 mounted on the bottom of the aircraft. In addition to the two TCAS antennas, two antennas 7 and 9 are also required for the mode S transponder 11. One antenna 7 is mounted on the top of the aircraft while the other antenna 9 is mounted on the bottom. In alternative embodiments, two antennas are shared by the mode S transponder 11 and TCAS computer 12.

In accordance with some embodiments, the TCAS computer 12 is configured to execute the following operations: build a three-dimensional map of aircraft in a surrounding airspace; determine if a conflict exists by extrapolating current range and altitude difference to anticipated future values; and determine whether an intruder aircraft has entered a protected volume of airspace that surrounds ownship. More specifically, the TCAS computer 12 executes a program that performs a conflict detection algorithm. Based on parameters applied by the conflict detection algorithm, the TCAS computer 12 first issues a Traffic Advisory if the intruder aircraft is within the protected airspace and then issues a Resolution Advisory if the TCAS computer 12 detects that the heading/track, climb rate, and closure rate of the intruder aircraft may cause the time to the closest point of approach to fall below a threshold value. The issuance of a Traffic Advisory is announced by an aural annunciator 17 which is communicatively coupled to the TCAS computer 12. That aural annunciation is accompanied by visual annunciations which are displayed on a display screen 18. The issuance of a Traffic Advisory by the TCAS computer 12 includes generating a TCAS Active signal instructing a receiving computer to arm an appropriate mode. The issuance of a Resolution Advisory by the TCAS computer 12 includes generating TCAS Guidance signals containing flight control information characterizing the recommended maneuver to avoid collision, including a numeric value representing a target vertical speed.

The automatic flight control system 10 partly depicted in FIG. 2 further includes the following components which are respectively communicatively coupled to the TCAS computer 12: a mode control panel 14 (which includes multiple processors), a display computer 16, an autopilot/flight director computer 20, and an autothrottle 22 (which may also be a separate computer). The issuance of a Traffic Advisory comprises sending a TCAS Active signal to the mode control panel 14, autopilot/flight director computer 20, and autothrottle 22. The issuance of a Resolution Advisory comprises sending TCAS Guidance signals to the mode control panel 14 and display computer 16. The TCAS Active signal notifies mode control panel 14, autopilot/flight director computer 20, and autothrottle 22 that RA-appropriate modes should be armed. The TCAS Guidance signals inform mode control panel 14 and display computer 16 regarding the target vertical speed.

The autopilot has readily distinguishable armed versus engaged modes in order to enable pilot awareness of the current autopilot state and upcoming state transitions. An armed mode is defined as a state that will be captured by the autopilot or flight director if and when a pre-condition is met (e.g., a selection is made by the pilot). An engaged mode is defined as a state that the autopilot or flight director is holding (e.g., as a result of the pilot selection). As explained above, the autopilot/flight director computer 20 and autothrottle 22 transition into respective armed modes in response to issuance of a Traffic Advisory. Thereafter the TCAS may issue a Resolution Advisory. However, in the autopilot or flight director the armed mode will not automatically transition to become the engaged mode in response to the Resolution Advisory if not authorized by the pilot to do so. Subsequent receipt of an appropriate command from the mode control panel 14 (or other pilot-accessible switching device), the autopilot or flight director transitions so that the armed mode becomes the engaged mode. In accordance with alternative embodiments, other hardware or software switches may be installed on the flight deck to enable a pilot to intervene in response to a TCAS alert, thereby avoiding changes to the existing mode control panel 14. In addition, in the autothrottle 22 the armed mode becomes the engaged mode in response to receipt of an appropriate command from the autopilot/flight director computer 20 subsequent to pilot authorization.

The mode control panel 14 receives both the TCAS Active signal and the TCAS Guidance signals. The mode control panel 14 is an instrument panel that controls autopilot and flight director modules hosted by the autopilot/flight director computer 20. The mode control panel 14 includes input devices that allow the pilot to select which parts of the aircraft's flight are to be controlled automatically. The mode control panel 14 may be used to instruct the autopilot to hold a specific altitude, to change altitudes at a target vertical rate, to hold a specific heading, to turn to a new heading, to follow the directions of a flight management computer, and so on. The mode control panel 14 simply sets the mode in which the autopilot operates. In the example scenario depicted in FIG. 2, the mode control panel 14 is shown sending VS Command and VS Engage signals to the autopilot/flight director computer 20. The VS Engage signal commands the autopilot to operate or the flight director to provide guidance in (engage) a vertical speed (V/S) TCAS mode. The V/S TCAS mode of the autopilot or flight director is configured to attempt to maintain a specific vertical speed of the aircraft. The VS Command signal contains flight control information, including a target vertical speed to be achieved while operating in the vertical speed mode.

In accordance with one embodiment, the autopilot/flight director computer 20 is configured to arm the V/S TCAS mode in response to receipt of the TCAS Active signal from the TCAS computer 12 and send a Next Autopilot Mode signal to the display computer 16 indicating that the V/S TCAS mode has been armed. Subsequent selection of the armed V/S TCAS mode by the pilot (using the mode control panel 14) causes the mode control panel 14 to send the VS Command and VS Engage signals to the autopilot/flight director computer 20. Because the V/S TCAS mode is armed, the autopilot or flight director function will engage the V/S TCAS mode in response to receipt of the VS Engage signal from the mode control panel 14. In addition, the autopilot/flight director computer 20 sends a Next Autopilot Mode signal to the display computer 16 indicating that the V/S TCAS mode has been engaged. The autopilot operating in the V/S TCAS mode controls the vertical speed of the aircraft to attain a target vertical speed provided by the TCAS computer 12 as part of the TCAS guidance. This vertical speed control is achieved by a flight control computer 6 that sends control signals to control surface actuators 19 (such as servos and fly-by-wire actuators) for adjusting the angular positions of the elevators 118. This procedure allows the aircraft to automatically maneuver to avoid a collision in an expeditious manner if the autopilot is engaged (turned ON). In the alternative, if the autopilot is not engaged (turned OFF), the pilot may elect to manually perform the collision avoidance maneuver by selecting the mode that the flight director uses to provide guidance using the mode control panel 14 and then obeying flight director commands. The flight director operating in the V/S TCAS mode provides guidance for controlling the vertical speed of the aircraft to attain a target vertical speed provided by the TCAS computer 12 as part of the TCAS guidance.

In addition, the autothrottle 22 is configured to operate in (engage) a speed (SPD) TCAS mode. The SPD TCAS mode of the autothrottle is configured to attempt to maintain the current speed of the aircraft. More specifically, automatic control of the thrust is engaged in the SPD TCAS mode to maintain a target speed of the aircraft. The target speed used by the SPD TCAS mode is the aircraft speed at the moment of the alarm. In addition, the autothrottle 22 sends a Next Autothrottle Mode signal to the display computer 16 indicating the SPD TCAS mode has been engaged. The thrust control is achieved by sending control signals to a full authority digital engine (or electronics) control 8 (hereinafter "FADEC 8"). The FADEC 8 includes a computer, called an "electronic engine controller" or "engine control unit", and its related accessories that control all aspects of aircraft engine performance.

The TCAS computer 12 sends the TCAS Guidance signals to a display system that includes a display computer 16 and a display screen 18. A typical flight deck or cockpit includes multiple display systems, but for the purpose of illustration, this disclosure will describe a display system in which the display computer 16 is configured to present a primary flight display on the display screen 18. The primary flight display presents symbology, graphical elements, icons, coloring, shading, highlighting, etc. in order to visually communicate air data and basic flight information. In particular, the display computer 16 may be configured so that the primary flight display includes a traffic display. The traffic display depicts the position of nearby traffic, relative to own aircraft. Displayed traffic information also includes traffic vertical speed indications, and Proximate, TA, and RA status. The traffic display aids the flight crew in the visual acquisition of transponder-equipped aircraft in advance to give them time to prepare to maneuver the aircraft in the event an RA is issued. Additionally or alternatively, the air data, flight information and traffic information disclosed in more detail hereinafter may be presented on a heads up display.

As mentioned above, the system proposed herein enables a pilot to not accept the automated response to the air traffic conflict alert and instead the pilot may elect to manually perform the collision avoidance maneuver by selecting the mode that the flight director uses to provide guidance for performing a collision avoidance maneuver. In accordance with one embodiment, the method comprises: (a) issuing an air traffic conflict alert; (b) generating a first annunciation that is observable by a pilot and indicates that the air traffic conflict alert has been issued; (c) generating a second annunciation that indicates a commanded parameter value included in guidance for the pilot to follow while flying the aircraft to perform a collision avoidance maneuver; (d) receiving an input signal from the pilot indicating that the pilot has selected a flight director mode to provide the guidance for the pilot to follow while flying the aircraft to perform the collision avoidance maneuver; and (e) following the guidance provided by the flight director in the selected flight director mode subsequent to steps (a) through (d) to control the aircraft to fly the collision avoidance maneuver.

Figure 3:
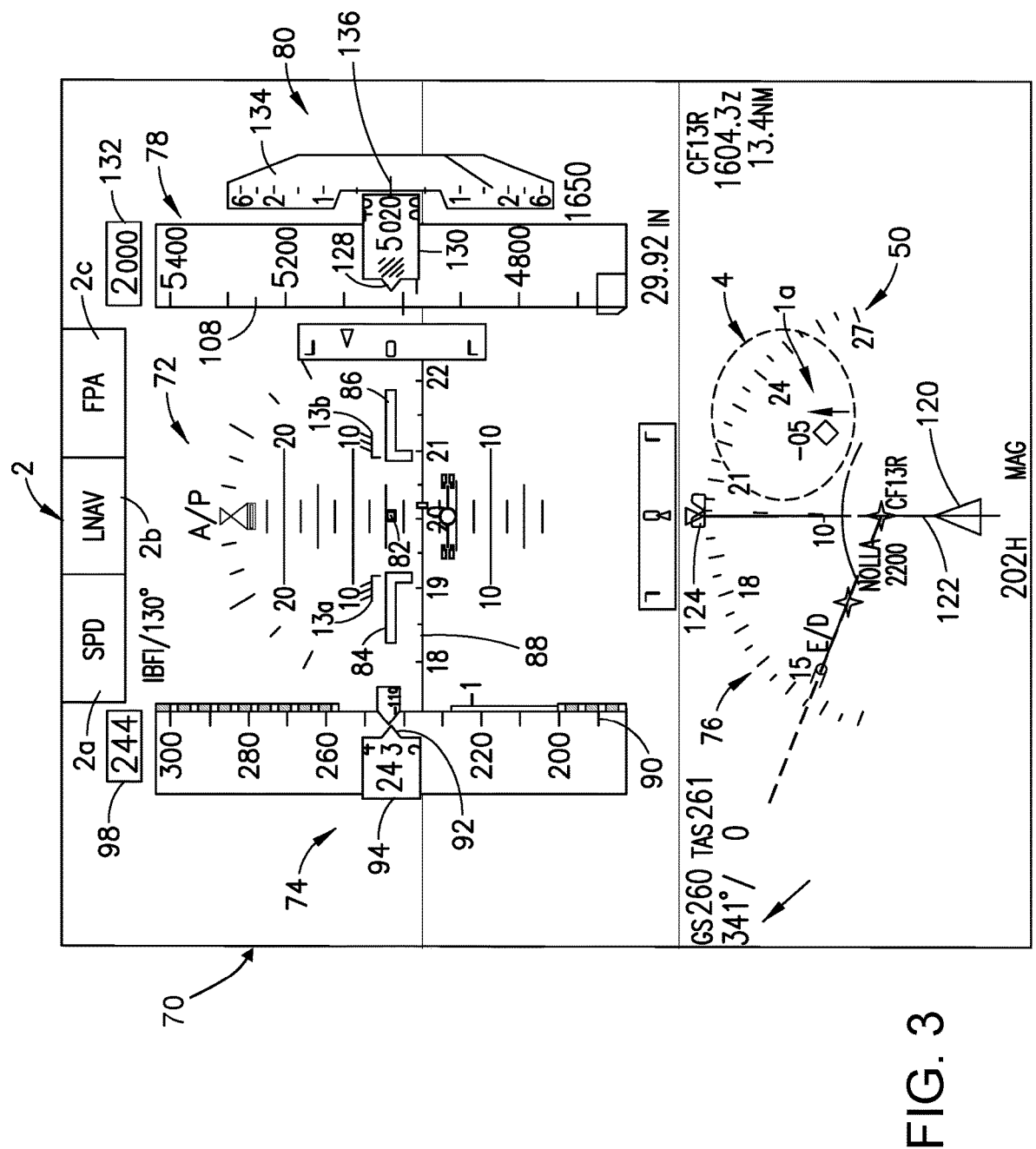
FIG. 3 is a diagram representing a front view of a primary flight display that includes a flight mode annunciator at the top of the display as well as TCAS annunciations in a heading indicator presented in the lowermost portion of the display.

FIG. 3 is a diagram representing a front view of a primary flight display 70 that includes a flight mode annunciator 2 at the top center of the display as well as TCAS annunciations 4 in a heading indicator 76 presented in the lowermost portion of the display. The primary flight display 70 shown in FIG. 3 does not include various innovative features that will be described below with reference to FIGS. 4, 7, 9 and 11.

Referring to FIG. 3, the display field of primary flight display 70 is divided into a plurality of electronic indicators. The electronic indicators include a centrally located attitude director indicator 72 which is substantially rectangular in shape and has a central boresight box 82 (hereinafter "boresight 82") representing the aircraft longitudinal axis at the center of the box. On either side thereof are conventional stationary aircraft wing symbols 84 and 86. An artificial horizon is provided by line 88. The symbols 13a and 13b indicate pitch limit. If the aircraft targets a pitch above this limit, the aircraft will go into stall.

Adjacent and along the left-hand side of attitude director indicator 72 is an air speed indicator 74 comprising a vertically movable air speed scale 90 (a.k.a. speed tape) having graduations representing air speed values along the right-hand side thereof. The numeric value of the target air speed is presented in a target air speed display field 98. The air speed indicator 74 further comprises a fixed pointer 92 which points inwardly toward the air speed scale 90. The pointer 92 is provided with a window 94 digitally indicating the air speed in response to instrumentation of the aircraft. As the air speed changes, the air speed scale 90 moves vertically relative to the fixed pointer 92. The air speed scale 90 presents a range of speed values above and below the current speed, with the numerics being disposed immediately to the left of the corresponding scale graduations. Portions of the scale or tape above and below the viewable range are blanked from the presentation. Moreover, the scale is blanked at the location of window 94 which supplies the numerical readout of the current speed as a "rolling" number.

In addition, the primary flight display 70 includes a vertically disposed altitude indicator 78 located adjacent the right-hand side of the attitude director indicator 72 in FIG. 3. The altitude indicator 78 is provided with an altitude scale 126 along the left-hand side thereof. The altitude indicator 78 is further provided with altitude numerics to the right of appropriate indicia on the scale. The altitude indicator 78 is of the moving scale or moving tape type wherein the altitude scale 126 moves with respect to a fixed pointer 128 as the altitude of the aircraft changes. Fixed pointer 128 includes an adjacent window 130 within which the correct altitude is digitally displayed in rolling number fashion. Thus, as altitude information from aircraft instrumentation changes, both the numerical indicia in window 130 and the position of the underlying altitude scale 126 change accordingly. Altitude indicia for altitudes above and below the range depicted on the viewable altitude scale 126 (a.k.a. tape) are blanked, as is the portion of the altitude scale 126 beneath window 130. Pointer 128 does not block the view of indicia along the left-hand side of altitude indicator 78, but points fixedly toward such indicia. The current value of the pilot-selected altitude is numerically represented in target altitude display field 132.

The primary flight display 70 shown in FIG. 3 also includes a vertical speed indicator 80 comprising a vertical speed scale 134 calibrated in thousands of feet per minute along the left-hand side thereof. The vertical speed indicator 80 is provided with a movable pointer 136 adapted to indicate the current vertical speed of the aircraft by pointing to the indicia of the scale 134, which is fixed in position. Pointer 136 is angularly movable from an apparent origin to the right of the vertical speed scale 134, from which the pointer 136 appears to extend radially outwardly. After the pilot selects a desired altitude, the vertical speed of the aircraft can be controlled so that pointer 136 points toward the selected altitude on the altitude indicator 78, and under these circumstances the vertical speed will be optimal for leveling out at the desired altitude. Vertical speed indicator 80 may further comprise a bug (not shown) which indicates a desired vertical speed selected by the pilot.

The indicators further include a heading indicator 76 in the lowermost portion of the primary flight display 70. The heading indicator 76 comprises an area having the shape of a segment of a circle or compass rose which is easily comprehensible by the viewer. The heading indicator 76 is provided with a degree scale 50 along the upper, arc-shaped portion thereof, and like the previously described air speed indicator 76, the degree scale 50 of heading indicator 76 moves with respect to a fixed vertical heading/track line 122 which indicates the current track of the aircraft. For other than the segment of the heading display as illustrated in FIG. 3, the compass rose is blanked out. A selected heading/track bug 124 is displayed at an angular position relative to degree scale 50 that corresponds to the heading/track selected by the pilot using the mode control panel 14, while the degree scale 50 is also positioned in response to the instrumentation such that the heading/track line 122 points to the correct indicia as identified by the numerics displayed at 10-degree intervals underneath the degree scale 50. In response to a change in the heading of the aircraft, the degree scale 50 will appear to rotate.

The heading indicator 76 also includes traffic display symbology. Both color and shape are used to assist the pilot in interpreting the displayed information. However, such colors are not apparent in the black-line drawings of the primary flight display included in this disclosure. In the example depicted in FIG. 3, own aircraft symbol 120 is a triangle. In practice, that triangle is typically filled with white or cyan color. Other aircraft are typically depicted using geometric symbols, depending on their threat status, as follows:

(1) An unfilled diamond, shown in either cyan or white, but not the same color as the own aircraft symbol 120, is used to depict other non-threat traffic of unknown altitude (not shown in FIG. 3).

(2) A filled diamond, shown in either cyan or white, but not the same color as own aircraft symbol 120, is used to depict proximate traffic. Such a proximate aircraft symbol 1a is depicted in FIG. 3. Proximate traffic is non-threat traffic that is within 6 nm and ±1200 ft from own aircraft (not shown in FIG. 3).

Figure 4:
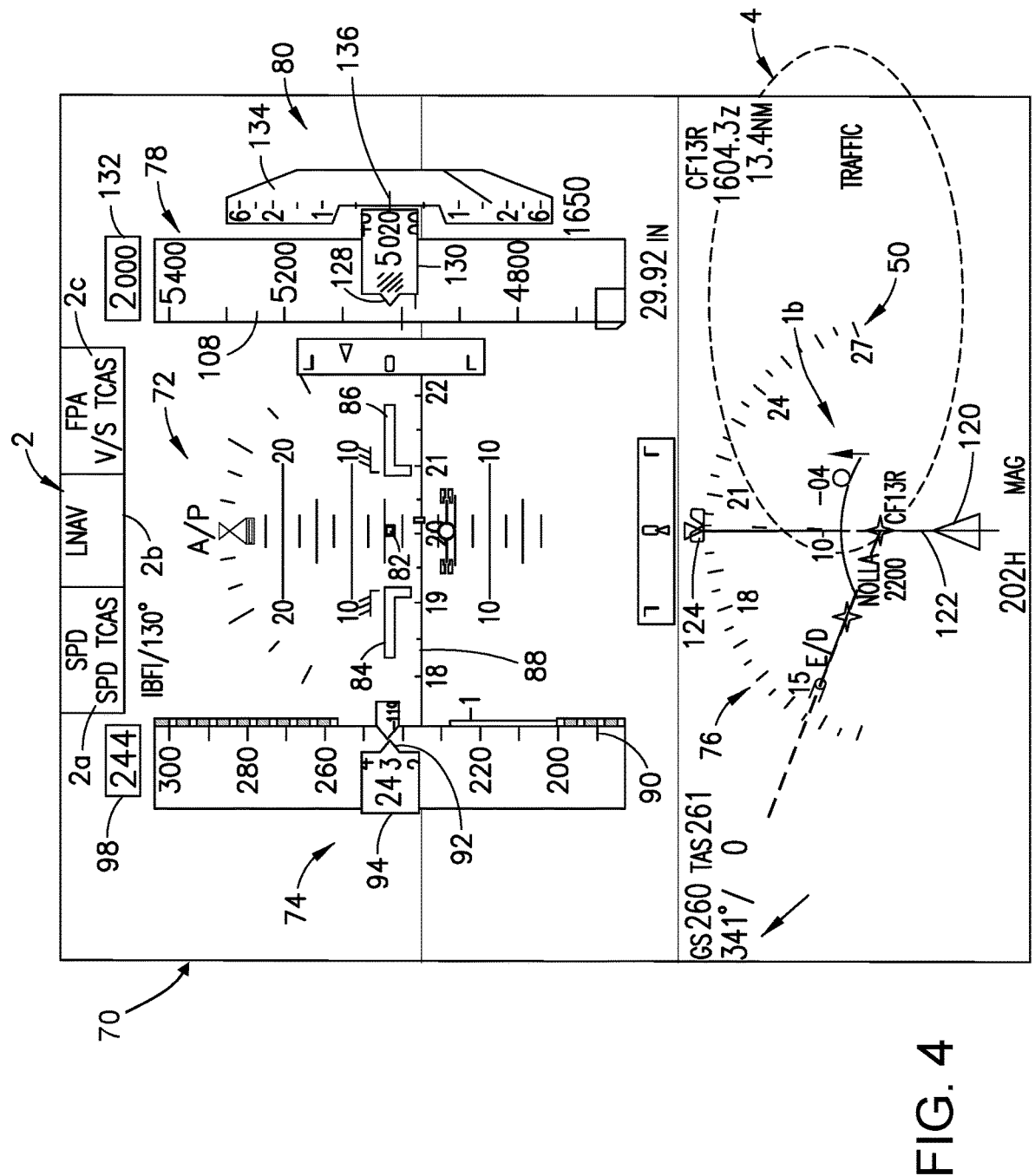
FIG. 4 is a diagram representing a primary flight display that is configured to display TCAS armed mode annunciations in the flight mode annunciator in response to issuance of a Traffic Advisory in accordance with one embodiment.

(3) A filled amber or yellow circle is used to display intruders that have caused a Traffic Advisory to be issued (not shown in FIG. 3). Such an intruder aircraft symbol 1b (hereinafter "TA symbol 1b") is depicted in FIG. 4. As used herein, "amber" refers to a dark orange yellow color.

Figure 5:
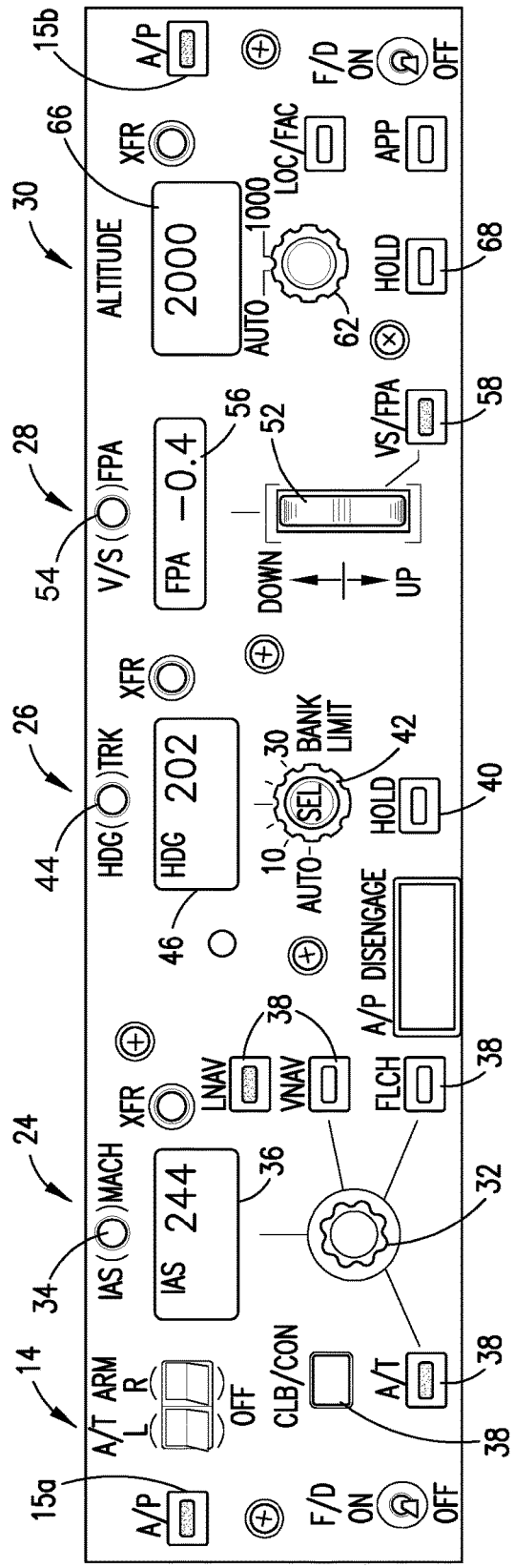
FIG. 5 is a diagram showing an example layout of a mode control panel having manipulatable input devices for enabling a pilot to manually select flight modes.

(4) A filled red square is used to display intruders that have caused a Resolution Advisory to be issued (not shown in FIG. 3). Such an intruder aircraft symbol 1c (hereinafter "RA symbol 1c") is depicted in FIG. 5.

When a Traffic Advisory (TA) or Resolution Advisory (RA) occurs, a visual annunciation consisting of amber text "TRAFFIC" is displayed on one side of the heading indicator 76 on the primary flight display 70 for both pilots, accompanied by symbols indicating TA, RA and Proximate traffic, within the selected display range. The display of other traffic assists the pilot in visually acquiring the intruder aircraft that caused the Traffic Advisory or Resolution Advisory. Although the proximate status of traffic can be derived by the pilot from the relative range and altitude, the symbol indication allows this state to be determined perceptually with a glance.

Each symbol is displayed on the screen, according to its relative position to own aircraft. Relative altitude is displayed in hundreds of feet above the symbol if the intruder is above own aircraft and below the symbol if the intruder is below own aircraft. When the intruder is above own aircraft, the relative altitude information is preceded by a "+" sign. When the intruder is below own aircraft, a "−" sign precedes the relative altitude information. The altitude information is displayed in the same color as the intruder aircraft symbol. In addition, an arrow is displayed immediately to the right of an intruder aircraft symbol when the intruder aircraft is reporting its altitude and is climbing or descending at more than 500 fpm. An up arrow is used for a climbing aircraft; a down arrow is used for a descending aircraft. The arrow is displayed in the same color as the intruder aircraft symbol.

The primary flight display 70 further includes a flight mode annunciator 2 at the top center of the display. The flight mode annunciator 2 indicates what system is controlling the aircraft and what mode is operational. The flight mode annunciator 2 is divided into three columns 2a-2c; each column has two rows. The leftmost column 2a displays the current speed mode of the autothrottle (a.k.a. autothrottle status), the center column 2b displays the current guidance mode (a.k.a. lateral mode status) and the rightmost column 2c displays the current pitch mode (a.k.a. "vertical mode status") of the autopilot. The upper row indicates modes that are operational (i.e., engaged) while the lower row indicates modes that are armed. Operational modes are typically colored green while armed modes are typically colored white. In the example depicted in FIG. 3, the flight mode annunciator 2 is indicating that the current speed mode is the SPD mode, the current guidance mode is the LNAV mode and the current pitch mode is the FPA mode.

The improved system for enabling a pilot to select an automated response to a TCAS Resolution Advisory proposed herein includes crew alerts consistent with existing autopilot annunciations to keep the crew aware of an impending RA action and what the system will do to recover from the RA event. In accordance with one embodiment, the system provides the pilot a preview of the TCAS RA command which can be selectively accepted into the automation. Also, a preview window or space is added to the mode control panel 14 to display the vertical speed guidance from the TCAS computer 12. New flight mode annunciations are provided to uniquely identify the TCAS RA response in pitch and speed prior to, during, and after the RA event. Upon apprehension of the TCAS alert, the pilot may validate the TCAS commands prior to deviating from the current trajectory or changing the automation state based on determination of the appropriateness of the alert.

FIG. 4 is a diagram representing a primary flight display 70 that is configured to display TCAS armed mode annunciations in the flight mode annunciator 2 in response to issuance of a Traffic Advisory in accordance with one embodiment. The TCAS armed mode annunciations presented in the flight mode annunciator 2 are in addition to the existing TCAS annunciations 4 described with reference to FIG. 3. The relative position of the intruder aircraft that caused the Traffic Advisory is represented by TA symbol 1b on the primary flight display 70. In response to the issuance of the Traffic Advisory, the V/S TCAS mode is annunciated as armed by displaying colored (e.g., amber) text "V/S TCAS" in the second row of the rightmost column 2c of the flight mode annunciator 2, while the first row still displays the current vertical speed mode ("FPA" mode in the example of FIG. 4). The autopilot system records the current vertical speed mode (e.g., Altitude Hold/Capture, Vertical Speed, Flight Level Change, Takeoff/Go-Around, Approach). If a previous autopilot mode was armed, this is also recorded. Amber would align with the TA warning color, but the V/S TCAS mode annunciation could be white like other flight mode annunciation armed modes depending on human factors requirements.

In addition, in response to the issuance of the Traffic Advisory, the SPD TCAS mode is annunciated as armed by displaying colored (e.g., amber) text "SPD TCAS" in the second row of the leftmost column 2a of the flight mode annunciator 2, while the first row still displays the current speed mode ("SPD" mode in the example of FIG. 4) in different colored text. The autothrottle system records the current speed mode (e.g. Speed, Idle, Thrust).

During flight of the aircraft (including RA events), the mode control panel 14 allows the pilot to interface with the flight management system. The mode control panel 14 may include a number of different sections, such as a direction section, an altitude section, a speed section and a vertical path section, for allowing the pilot to control various functions of the flight management system. Each section comprises one or more manually operable control devices.

FIG. 5 is a front view of a mode control panel 14 that does not incorporate various innovative features that will be described below with reference to FIG. 6. The mode control panel 14 depicted in FIG. 5 provides means for controlling the autopilot, flight director and autothrottle. The mode control panel 14 is used to select and activate autopilot/flight director modes and establish altitudes, speeds and climb/descent profiles. The mode control panel 14 comprises a speed section 24, a direction section 26, a vertical path section 28 and an altitude section 30. The electronic indicators 74, 76, 80 and 78 shown in FIGS. 3 and 4 are respectively associated with speed section 24, direction section 26, vertical path section 28, and altitude section 30 of the mode control panel 14. In addition to knobs/wheel and switches, each section of the mode control panel 14 includes related display windows.

FIG. 5 is a diagram showing an example layout of a mode control panel 14 having manipulatable input devices for enabling a pilot to manually select flight modes, including switches (e.g., toggle switches) represented by one rectangle (representing a light-emitting element) inside and surrounded by another rectangle (representing a button). In the state of the mode control panel 14 depicted in FIG. 5 (as well as the states depicted in FIGS. 6, 8, 10 and 12), speckles within internal rectangles indicate that the light-emitting element is illuminated (emitting light), whereas the absence of speckles indicates that the light-emitting element is not illuminated (not emitting light).

As seen in FIG. 5, the speed section 24 comprises a speed knob/selection button 32, an indicated airspeed (IAS)/MACH number speed mode selection switch 34, a speed display window 36 that displays the speed selected, and mode selection buttons 38 with mode active indicator lights. The IAS/MACH speed mode selection switch 34 is a toggle switch that allows the pilot to choose between IAS and MACH number speed modes of operation, including alternately changing the speed display window 36 between IAS and Mach number displays. In operation, the mode selection buttons 38 can be pushed to engage a particular mode of guidance (i.e., LNAV, VNAV, FLCH or A/T (autothrottle)) and can illuminate to indicate that the selected mode is active.

A speed management module is engaged by pushing speed knob/selection button 32. The term "module" as used herein, may refer to any combination of software, firmware, or hardware used to perform the specified function or functions. When speed knob/selection button 32 is pushed, the speed management module is synchronized to the current aircraft speed. Thereafter the speed of the aircraft is increased or decreased by rotating the speed knob/selection button 32. During knob rotation, the indicated speeds in the speed display window 36 and in the primary flight display (not shown in FIG. 3) are set to the selected speed. Pushing speed knob/selection button 32 a second time exits the speed management mode of operation and engages a speed transition module for returning control of the aircraft to the preprogrammed speed profile, such as, for example, a VNAV speed profile stored in the flight management computer 102 (see FIG. 1).

Referring again to FIG. 5, the direction section 26 of the mode control panel 14 comprises a heading knob/selection button 42, a heading/track mode selection switch 44, and a direction display window 46 that displays the selected heading or track. The heading/track mode selection switch 44 is a toggle switch that allows the pilot to choose between heading and track modes of operation and alternately changes the direction display window 46 and the primary flight display (not shown in FIG. 5) references between vertical speed (VS) and flight path angle (FPA). A direction management module is engaged by pushing the heading knob/selection button 42, thereby selecting Heading Select or Track Select as the roll mode. The bank angle is limited by the angular position of an outer knob or sleeve (such a bank limit selector is well known in the art and will not be described in detail herein). Rotating the heading knob/selection button 42, after it has been pushed, controls the direction of the aircraft, i.e., rotation of the heading knob steers the aircraft, and sets the heading or track in the direction display window 46 and in the primary flight display. Pushing the LNAV mode selection button 38 arms LNAV. This results in the aircraft intercepting and following the preprogrammed flight route entered into the flight management computer 102 prior to takeoff or during the flight. That is, the aircraft returns the LNAV mode of operation of the flight management computer 102. If the aircraft is not on the preprogrammed flight route when pilot management of direction is cancelled, the aircraft follows the heading or track determined by the direction display window 46 until the preprogrammed flight route is captured and LNAV engages. Pushing the heading HOLD switch 40 selects Heading Hold or Track Hold as the roll mode and maintains the current aircraft heading.

Still referring to FIG. 5, the vertical path section 28 of the mode control panel 14 comprises a vertical speed wheel 52, a vertical speed/flight path angle mode selection switch 54; a vertical speed display window 56 that displays the selected V/S or FPA mode, and a VS/FPA engage button 58 (with integrated light). Pushing the VS/FPA engage button 58 engages a vertical path subroutine and displays the current vertical speed or flight path angle in the vertical speed display window 56. The light of VS/FPA engage button 58 indicates that the V/S or FPA mode is engaged. The VS/FPA mode selection switch 54 is a toggle switch that toggles between the V/S and FPA modes of operation. The vertical path subroutine is synchronized to the current vertical speed or flight path angle, depending upon the state of the VS/FPA mode selection switch 54. The VS/FPA mode selection switch 54 alternately changes the vertical speed display window 56 and primary flight display references between V/S and FPA modes. Rotation of the vertical speed wheel 52 in the up or down direction causes the selected criteria (vertical speed or flight path angle) to increase or decrease, depending upon the direction of rotation, and causes the vertical speed or flight path angle to be set in the vertical speed display window 56 and primary flight display (not shown in FIG. 5). Typically the pilot would allow V/S or FPA to be flown until the altitude target in the altitude display window 66 is reached, at which point there would be an automatic transition to altitude hold. The pilot may push the VNAV mode selection button 38, which results in control of the aircraft returning to the preprogrammed instructions stored in the flight management computer. That is, the aircraft returns to following the VNAV profile instructions. If the aircraft is not on the preprogrammed flight route when pilot management of direction is cancelled, the aircraft follows the VS or FPA determined by the current value of the vertical speed window 56 until the preprogrammed flight route is captured and VNAV engages. The pilot may also press the ALT HOLD button 68 to cause the aircraft to level out and transition from VNAV or V/S or FPA or FLCH to an altitude hold mode.

Still referring to FIG. 5, the altitude section 30 of the mode control panel 14 comprises an inner altitude knob/selection button 62, an outer altitude increment selector knob 64 and an altitude display window 66. Rotation of the altitude knob/selection button 62 controls the numerical value displayed by the altitude display 66 and by the primary flight display. After the chosen numerical altitude is set, depression of the altitude knob/selection button 62 initiates a climb/descent to the selected altitude. The outer altitude increment selector knob 64 has two settings: AUTO—the altitude selector changes in 100-foot increments; and 1000—the altitude selector changes in 1000-foot increments. The altitude HOLD switch 68 engages Altitude Hold as the pitch mode. The AFDS commands pitch to maintain the current altitude when switch 68 is pushed.

Other control panel devices depicted in FIG. 5 are well known to persons skilled in the art (see, e.g., A/P, F/D, NT ARM (L/R), CLB/CON, NT, A/P DISENGAGE, and APP) and will not be described here.

Figure 6:
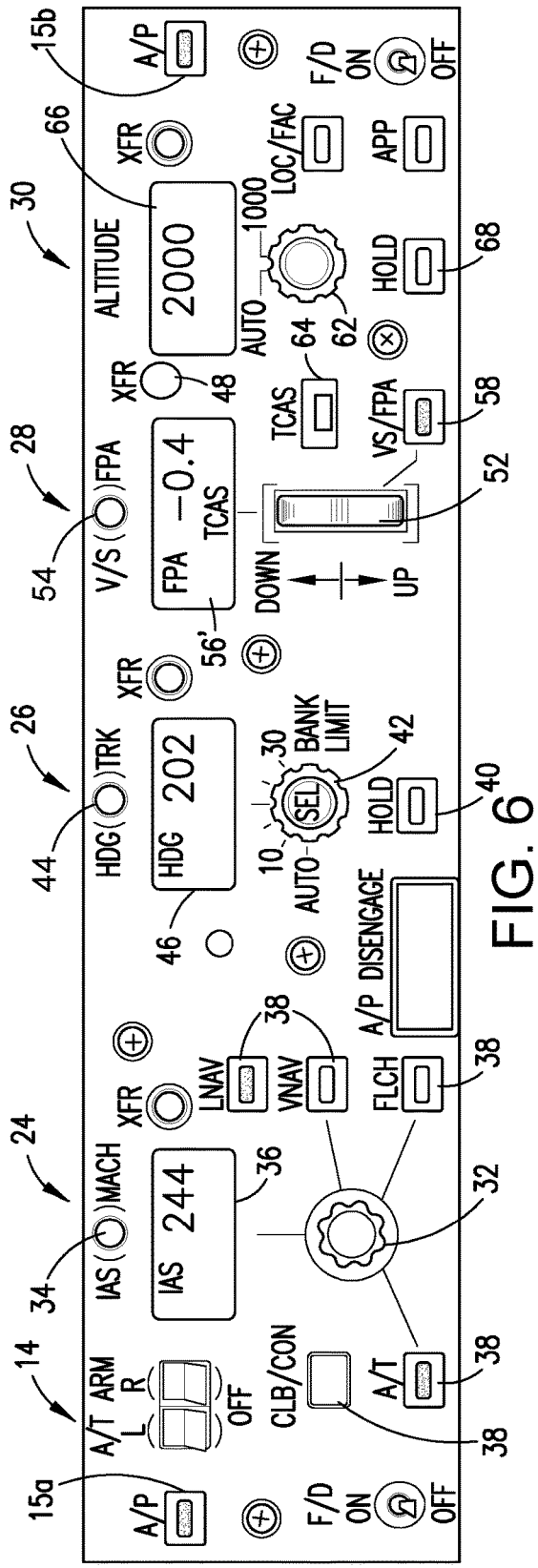
FIG. 6 is a diagram showing a mode control panel which is configured to display a TCAS armed mode annunciation in the second row of a vertical speed display window in response to issuance of a Traffic Advisory and which further includes manipulatable input devices for enabling a pilot to authorize an automated response to issuance of a Resolution Advisory in accordance with one embodiment.

FIG. 6 is a diagram showing an enhanced mode control panel 14 which is configured to display a TCAS armed mode annunciation in the second row of a vertical speed display window 56' in response to issuance of a Traffic Advisory and which further includes manipulatable input devices (e.g., transfer button 48 and TCAS button 64) for enabling a pilot to authorize an automated response to issuance of a Resolution Advisory in accordance with one embodiment. The only visible differences between the mode control panels depicted in FIGS. 5 and 6 are: (1) the vertical speed display window 56 having a single row in the mode control panel depicted in FIG. 5 has been replaced by an enlarged vertical speed display window 56' having two rows in mode control panel 14; (2) mode control panel 14 depicted in FIG. 6 has an additional transfer (XFR) button 48 which is absent from the mode control panel depicted in FIG. 5; and (3) mode control panel 14 depicted in FIG. 6 has a TCAS button 64 which is absent from the mode control panel depicted in FIG. 5. The functionality of transfer button 48 and TCAS button 64 will be described below with reference to FIG. 8.

As seen in FIG. 6, in response to issuance of a Traffic Advisory, a TCAS armed mode annunciation is displayed in the second row of the vertical speed display window 56'. In accordance with one proposed implementation, the color of the TCAS armed mode annunciation is amber. The TCAS armed mode annunciation is displayed in order to indicate to the pilot that the autopilot may potentially and imminently receive a TCAS vertical speed (V/S TCAS) command from the mode control panel 14.

Figure 7:
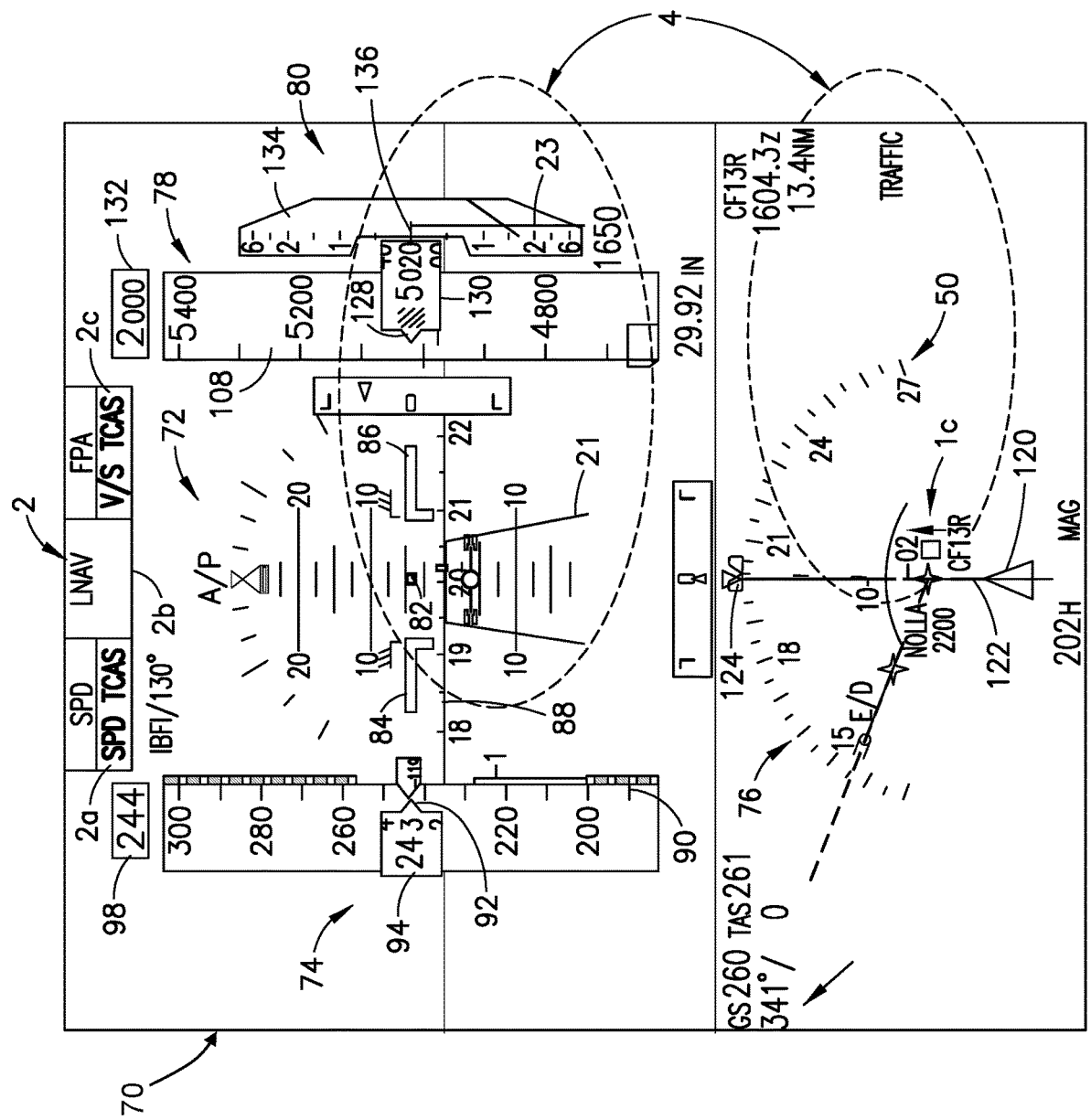
FIG. 7 is a diagram representing a modified state of the primary flight display depicted in FIG. 4 after issuance of a Resolution Advisory in accordance with one embodiment, the modifications including the display of pitch angle and vertical speed guidance symbols and a change in color (indicated by boldfacing) of the TCAS mode annunciations in the second row of the flight mode annunciator.

FIG. 7 is a diagram representing a modified state of the primary flight display 70 depicted in FIG. 4 after issuance of a Resolution Advisory in accordance with one embodiment, In accordance with TCAS display protocol, the TA symbol 1*b* is replaced by an RA symbol 1*c* which reflects that an intruder aircraft at a relative position corresponding to the relative position of the displayed RA symbol 1*c* depicted in FIG. 7 is the target of the Resolution Advisory.

In accordance with the teachings in U.S. Pat. No. 5,248, 968, the modifications also include the display of a pitch angle guidance symbol 21 and a vertical speed guidance symbol 23 on the attitude director indicator 72. This symbology is designed to guide the pilot how to adjust the pitch of the aircraft in order to avoid a potential collision when an aircraft enters the TCAS-protected airspace surrounding the aircraft, i.e., when an intruder is present. The pitch guidance symbol 21 comprises a horizontal or pitch axis leg and a pair of diverging legs. The pitch angles outlined by the pitch axis leg and diverging legs denote the pitch attitudes to be avoided. FIG. 7 illustrates a situation wherein the present pitch attitude of the aircraft will provide sufficient separation from the intruder because the three-part aircraft symbol (boresight 82 and aircraft wing symbols 84 and 86) lies outside of the area enclosed by the pitch guidance symbol 21.

In addition, in response to issuance of a Resolution Advisory, a vertical speed guidance symbol 23 is displayed on the vertical speed indicator 80. In the example implementation depicted in FIG. 6, the vertical speed guidance symbol 23 is a vertical straight line having an extent that spans the range of vertical speeds to be avoided when the V/S TCAS mode is operative (engaged).

In accordance with the innovative technology proposed herein, an additional modification to the primary flight display 70 in response to issuance of a Resolution Advisory is that the V/S TCAS text displayed in the first row of the rightmost column 2*c* changes color (indicated by boldfacing in FIG. 7), e.g., from amber to red, which informs the pilot that: (1) a Resolution Advisory has been issued; and (2) the TCAS is awaiting a signal indicating that the pilot has accepted invocation of an automated response to the Resolution Advisory.

Figure 8:
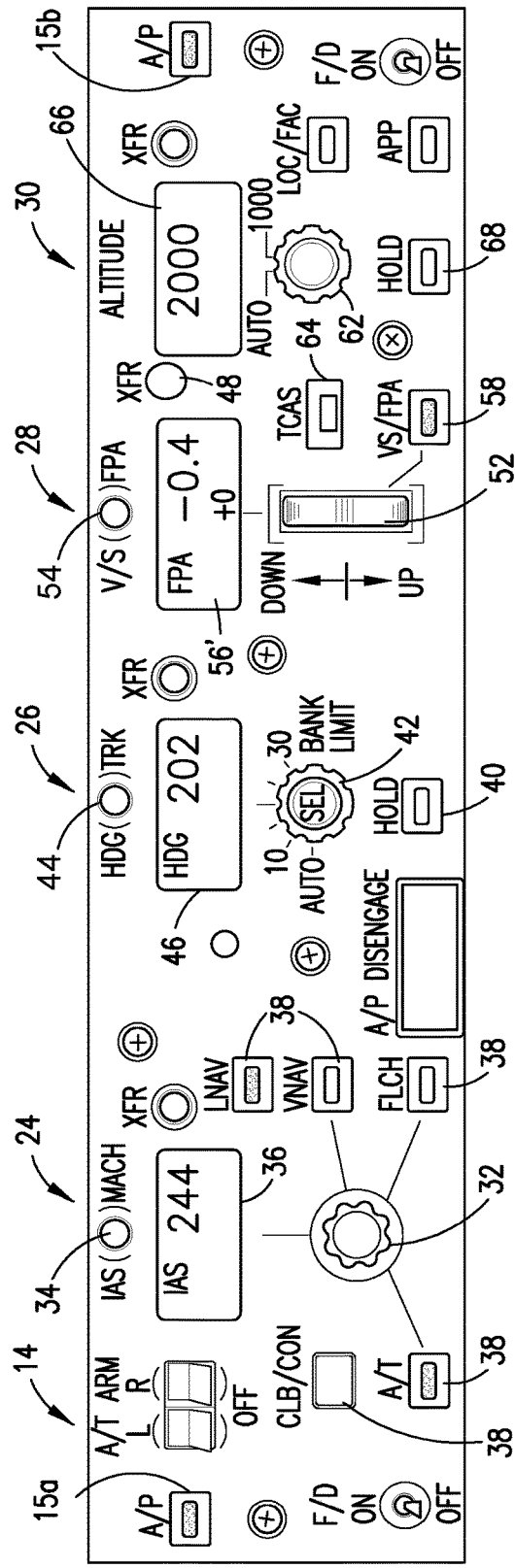
FIG. 8 is a diagram showing a mode control panel which is configured to display a RA vertical speed threshold in place of the TCAS armed mode annunciation in the second row of the vertical speed display window in response to issuance of a Resolution Advisory in accordance with one embodiment.

FIG. 8 is a diagram showing mode control panel 14 which is further configured to display a RA vertical speed threshold (e.g., "+0") in place of the TCAS armed mode annunciation (seen in FIG. 6) in the second row of the vertical speed display window 56" in response to issuance of the Resolution Advisory. The pilot may push a button to accept the RA command. This could be implemented in several ways: (1) transfer (XFR) button 48; (2) TCAS button 64; or VS/FPA engage button 58. The modifications to the primary flight display 70 and to the displays on the mode control panel 14 in response to the pilots acceptance of the RA command are respectively shown in FIGS. 9 and 10.

Figure 9:
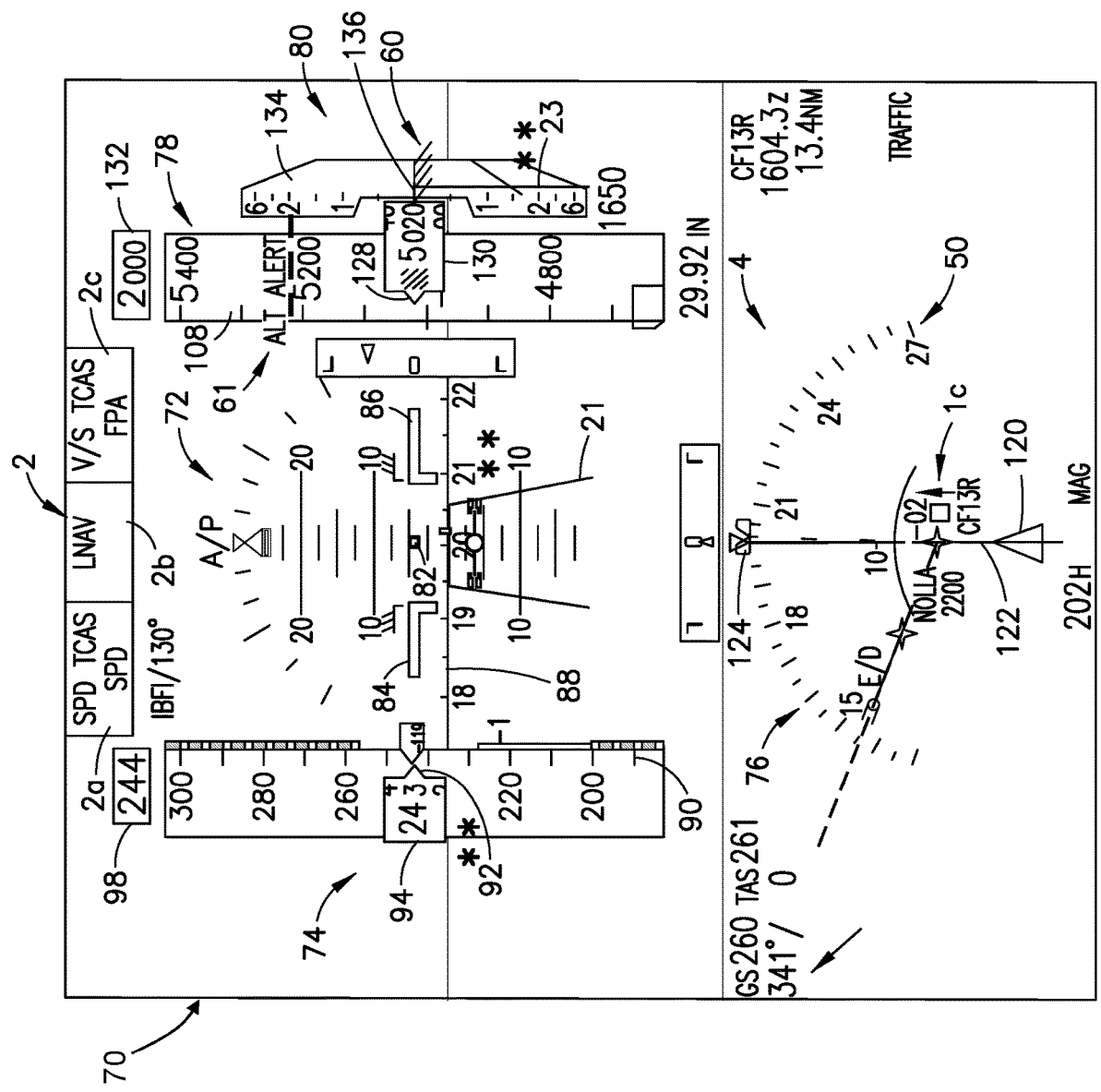
FIG. 9 is a diagram representing a modified state of the primary flight display depicted in FIG. 7 in response to pilot acceptance of an automated response to the Resolution Advisory to be performed by the autopilot and autothrottle. The double asterisks in FIG. 9 (and FIG. 11) indicate that the change in aircraft state is not depicted (e.g., the depicted state is prior to execution of the TCAS commands).

FIG. 9 is a diagram representing a modified state of the primary flight display depicted in FIG. 7 in response to pilot acceptance of the automated response to the Resolution Advisory to be performed by the autopilot and autothrottle. The modifications include: (1) moving the TCAS mode annunciations from the second row to the first row in the leftmost and rightmost columns 2*a* and 2*c* of the flight mode annunciator 2; (2) displaying an altitude alert symbol 61 on the altitude indicator 78; and (30 displaying a keep-out bar 60 on the vertical speed indicator 80. The double asterisks in FIG. 9 indicate that the change in aircraft state that will result from the pilots acceptance is not depicted (e.g., the depicted state is prior to execution of the TCAS RA commands).

Still referring to FIG. 9, the active autopilot pitch mode in the first row of the rightmost column 2*c* of flight mode annunciator 2 changes to the V/S TCAS mode, whereas the armed mode in the second row of the rightmost column 2*c* of flight mode annunciator 2 is annunciated based on logic such as the examples listed in the table described in some detail below. In addition, the active autothrottle mode in the first row of column 2*a* of flight mode annunciator 2 changes to the SPD TCAS mode, whereas the armed mode in the second row of the leftmost column 2*a* of flight mode annunciator 2 is annunciated based on logic such as the examples listed in the table described in some detail below. If the previous mode was an altitude hold mode, an altitude alert symbol 61 is displayed on the altitude indicator 78. (This is in addition to the existing altitude alert.) The RA vertical speed threshold is presented as a "keep-out" bar 60 with hash marks on the vertical speed indicator 80 and will initially align with the vertical speed value presented in the vertical speed display window 56' on the mode control panel 14. The pilot may elect to increase the target vertical speed if desired, but cannot command into the TCAS keep-out region indicated by "keep-out" bar 60.

Figure 10:
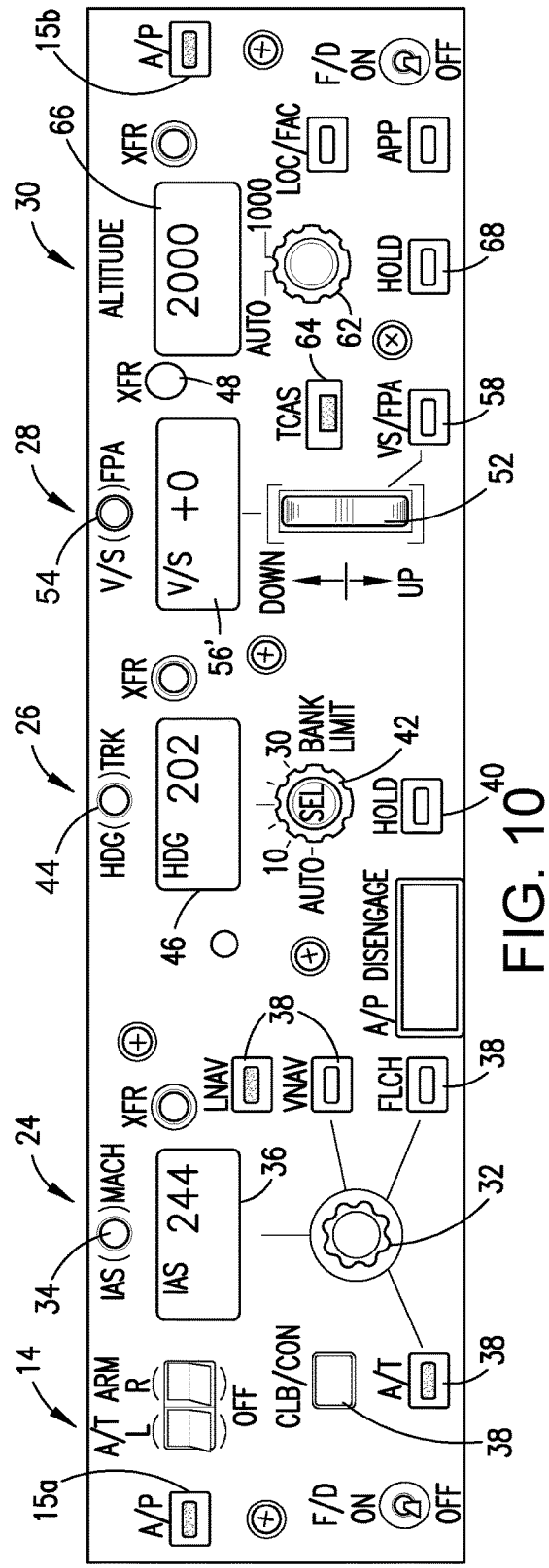
FIG. 10 is a diagram showing a mode control panel which is configured to display a vertical speed target in the first row of the vertical speed display window in response to pilot acceptance of the automated response to the Resolution Advisory. In the state depicted in FIG. 10, a TCAS button is illuminated to indicate that the automatic response has been accepted by the pilot and is now being executed.

FIG. 10 is a diagram showing a mode control panel 14 which is configured to display a vertical speed target in the first row of the vertical speed display window 56' in response to pilot acceptance of the automated response to the Resolution Advisory. In the state depicted in FIG. 10, the TCAS button 64 is illuminated (indicated by shading) to indicate that the automatic response has been accepted by the pilot and is now being executed. If the autopilot is engaged, the V/S TCAS command will be automatically followed in response to the pilot pressing the appropriate button on the mode control panel 14 or other manually operable input device appropriately configured to communicate with the autopilot. If the flight director system is in use, the flight director will issue guidance for the pilot to manually follow the specified RA instructions which have been calculated to increase the separation distance between the own aircraft and the target aircraft.

Figure 11:
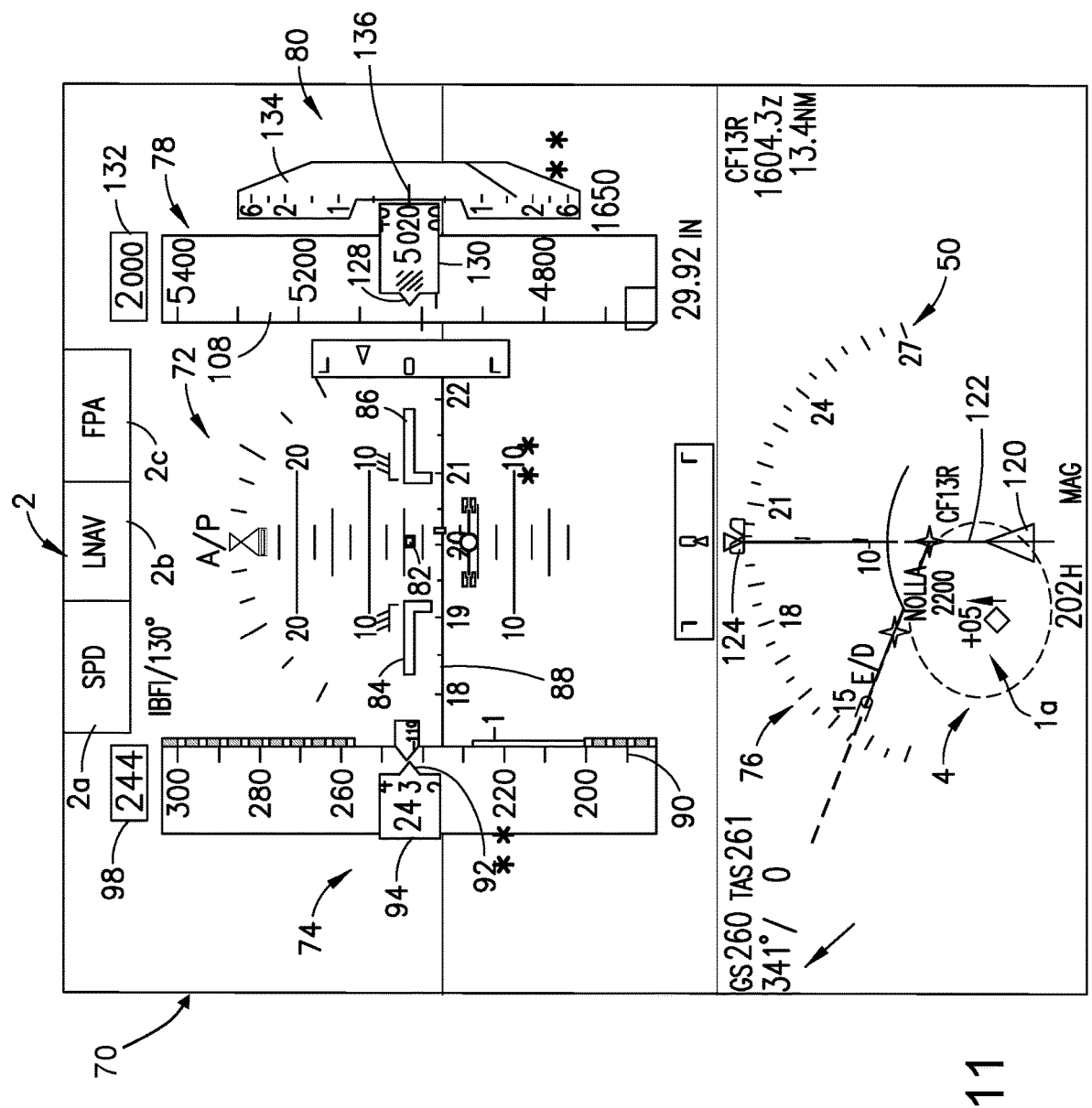
FIG. 11 is a diagram representing a modified state of the primary flight display depicted in FIG. 9 in response to clearance of the Resolution Advisory, which modified state includes changes to the flight annunciator indicating restoration of the autopilot and autothrottle modes indicated in FIG. 3 and removal of the TCAS guidance and alert symbols depicted in FIG. 9.

Upon completion of the automated collision avoidance maneuver, the Resolution Advisory is cleared by the TCAS computer 12 (see FIG. 2). FIG. 11 is a diagram representing a modified state of the primary flight display 70 depicted in FIG. 9 in response to clearance of the Resolution Advisory. The modifications include: (1) removal of the flight mode annunciations FPA and SPD from the second row of columns 2*a* and 2*c* of the flight annunciator 2; (2) removal of the flight mode annunciations V/S TCAS and SPD TCAS from the first row of columns 2*a* and 2*c* of the flight annunciator 2; and (3) display of the flight mode annunciations FPA and SPD in the first row of columns 2*a* and 2*c* of the flight annunciator 2. The appearance of the flight mode annunciations FPA and SPD in the first row of columns 2*a* and 2*c* of the flight annunciator 2 notifies the pilot that the flight modes which were originally operating at the time of the Traffic Advisory have been restored, i.e., are again active (operative). The double asterisks in FIG. 11 indicate that the change in aircraft state that will result from the automated recapture of the pre-RA autopilot and autothrottle modes is not depicted (e.g., the depicted state is prior to execution of the mode recapture commands).

Figure 12:
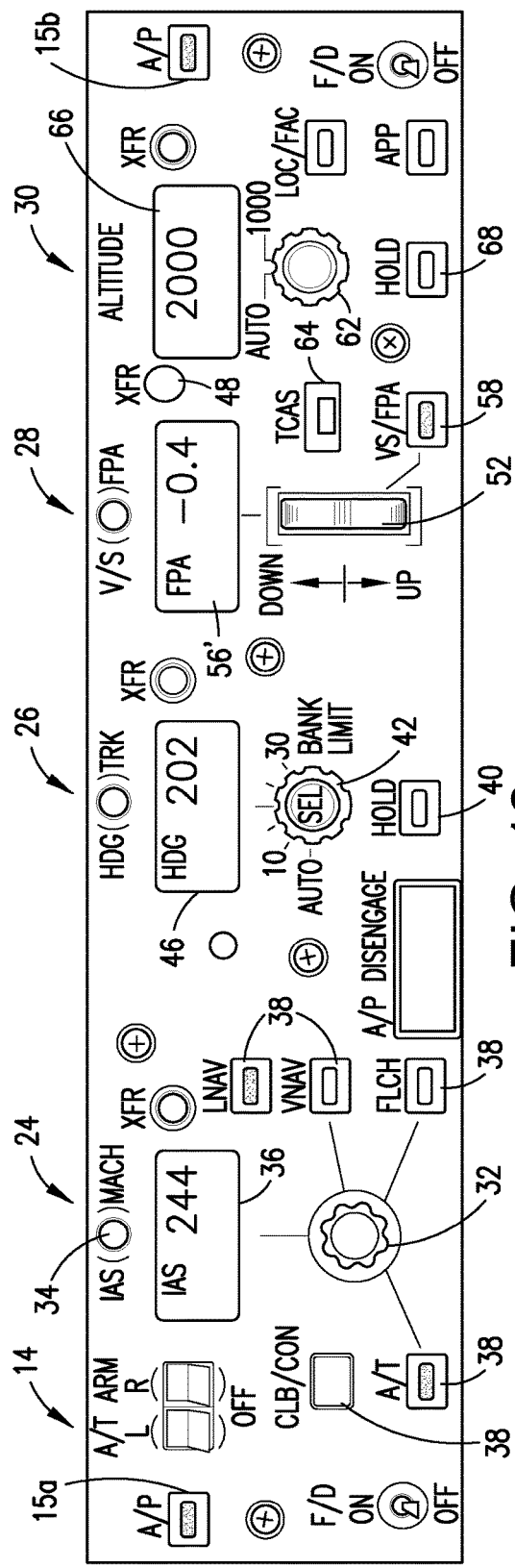
FIG. 12 is a diagram showing a mode control panel which is which is configured to restore the pre-RA vertical speed/flight path angle mode annunciation in the first row of the vertical speed display window in response to clearance of the Resolution Advisory.

FIG. 12 is a diagram showing a mode control panel 14 which is configured to restore the pre-RA vertical speed/flight path angle mode annunciation in the first row of the vertical speed display window 56' in response to clearance of the Resolution Advisory. The vertical speed display window 56' is updated to reflect new modes as appropriate.

The table below shows an example matrix of before/after automation state transitions for the TCAS with pilot-authorized automated response capability proposed herein. The proposed system will allow for various contingencies relevant to the operation of the target platform. For systems that allow autopilot and autothrottle to be engaged separately, the autothrottle must be armed or active to allow the automated response to a Resolution Advisory disclosed herein to occur. If the autothrottles are armed, but not active, they will automatically engage. The table summarizes how the recapture modes might be determined by a system configured to enable pilot-authorized automated response to a collision avoidance alert (such as a Resolution Advisory) in accordance with one proposed implementation. In the Speed on Elevator mode, the thrust is fixed and the automation uses the elevator to track a speed target (during a climb or descent). In the Speed on Throttle mode, the throttle tracks the speed target and the elevator is used for some other task (altitude hold/capture, VS/FPA, glide slope).

could render unnecessary updating the mode control panel to pre-fill the vertical speed display 56' and inclusion of extra buttons/button functionality to engage the mode. An example sequence is as follows:

(1) The pilot procedurally leaves the switch in the OFF position.

(2) Upon issuance of the initial Traffic Advisory alert, the pilot moves the AUTO TCAS switch 148 to the ON position. The primary flight display still shows the TCAS speed and pitch modes armed. No changes are needed to the mode control panel.

(3) If a Resolution Advisory is issued, the automation or guidance now automatically follows the TCAS guidance. The primary flight display updates to show TCAS active modes and next modes as armed (as described above). The system may include some delay between the instant when the Resolution Advisory was issued and the autopilot response to allow pilot intervention.

Figure 14:
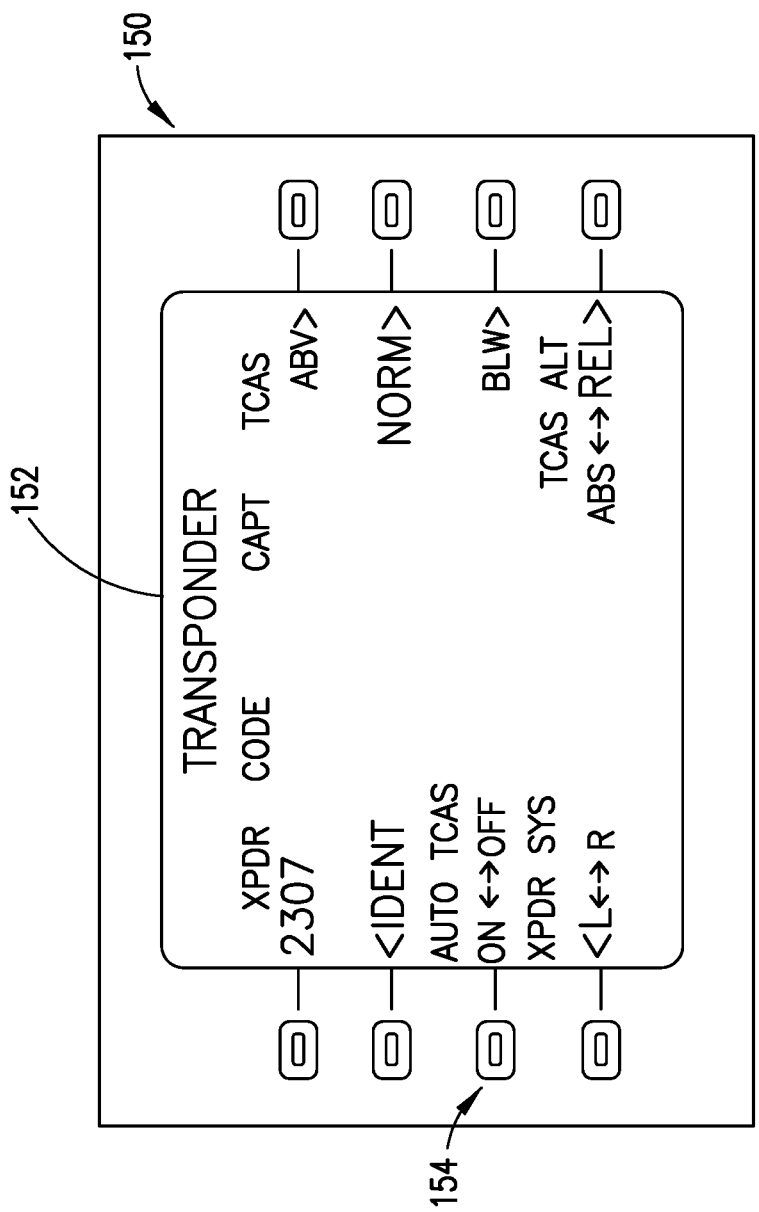
FIG. 14 is a diagram showing a scratchpad of a control display unit that includes a pilot-selectable software switch with two states: ON which would allow a V/S command to be automatically loaded to the autopilot, or OFF wherein the pilot is given the opportunity to preview the V/S command before accepting the automated response or not.

FIG. 14 is a diagram showing a scratchpad 152 of a control display unit 150 that includes a pilot-selectable software switch 154 with two states: ON which would allow a V/S TCAS command to be automatically loaded to the autopilot, or OFF wherein the pilot is given the opportunity to preview the V/S TCAS command before accepting the automated response or not.

In accordance with an alternative embodiment, an airline operator-selectable software option may be provided that

TABLE

| AF Mode Was | AT Mode Was | Armed AP Mode While RA Is Active | Armed AT Mode While RA Is Active |
|---|---|---|---|
| Altitude Hold | Speed on Throttle | Speed on Elevator* | Thrust/Idle |
| Speed on Elevator | Thrust (climb) | Speed on Elevator | Thrust (climb) |
| Speed on Elevator | Idle/Hold (descent) | Speed on Elevator | Idle/Hold (descent) |
| Vertical Speed | Speed on Throttle | Vertical Speed | Speed on Throttle |
| Vertical Navigation | Engaged | Vertical Navigation (Speed Mode) | Thrust |
| Glideslope | Speed on Throttle | Go-Around** | Thrust |

*Note that in this example the armed "return" mode is not the same as the initial mode due to the need to return to the previously held altitude.
**For approach modes (e.g., glideslope) the appropriate system response may depend on additional factors such as the approach phase (glideslope capture versus at minimum altitude). Further, there may be some scenarios under which the option for the automated response is suppressed.

The system proposed herein further includes means for enabling a pilot to manage the automation configuration to require pilot authorization or not. The case involving pilot authorization has already been described above. In an alternative automation configuration, pilot authorization may be automatically generated in response to issuance of a Resolution Advisory. The pilot authorization could be made automatic as an optional feature through several alternative mechanisms.

Figure 13:
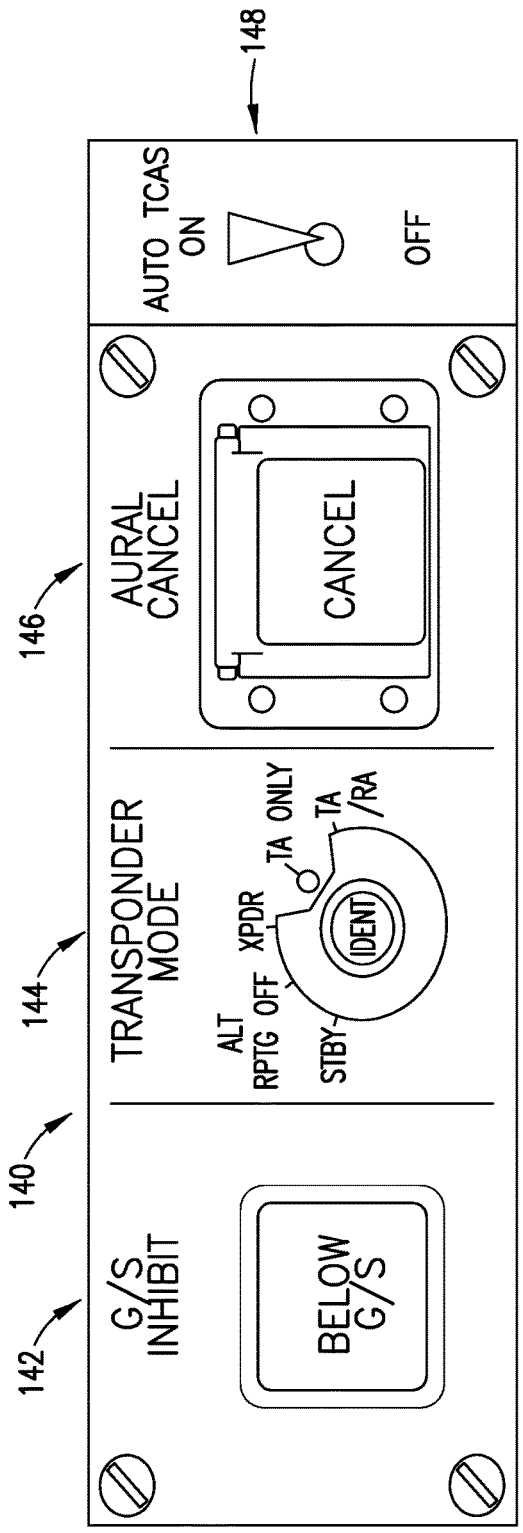
FIG. 13 is a diagram showing a portion of a main instrument panel that includes a pilot-selectable hardware switch with two states: ON which would allow a V/S command to be automatically loaded to the autopilot, or OFF wherein the pilot is given the opportunity to preview the V/S command before accepting the automated response or not.

FIG. 13 is a diagram showing a portion of a main instrument panel 140 that includes a glideslope inhibit button 142, a transponder mode knob/selection button 144 and an aural annunciation cancellation button 146. The main instrument panel 140 further includes a pilot-selectable AUTO TCAS hardware switch 148 (hereinafter "AUTO TCAS switch 148") with two states: ON, which would allow a V/S TCAS command to be automatically loaded to the autopilot, or OFF, wherein the pilot is given the opportunity to preview the V/S TCAS command before accepting the automated response or not. The AUTO TCAS switch 148 may be a switch like the flight director switch on the mode control panel, a turn dial or a guarded two-state button.

The AUTO TCAS switch 148 could be employed in place of some sequence elements described above with reference to FIGS. 3-12. Specifically, the AUTO TCAS switch 148 will govern whether the system will automatically respond to TCAS Resolution Advisories or the pilot must authorize the automated response. The pilot could not alter this setting. In accordance with one proposed implementation, this feature may be a catalog option that the customer would select or not. In response to that selection, the aircraft manufacturer would set a pin or bit one way or another to enable or disable the ability of the pilot to alter the setting.

Figure 15:
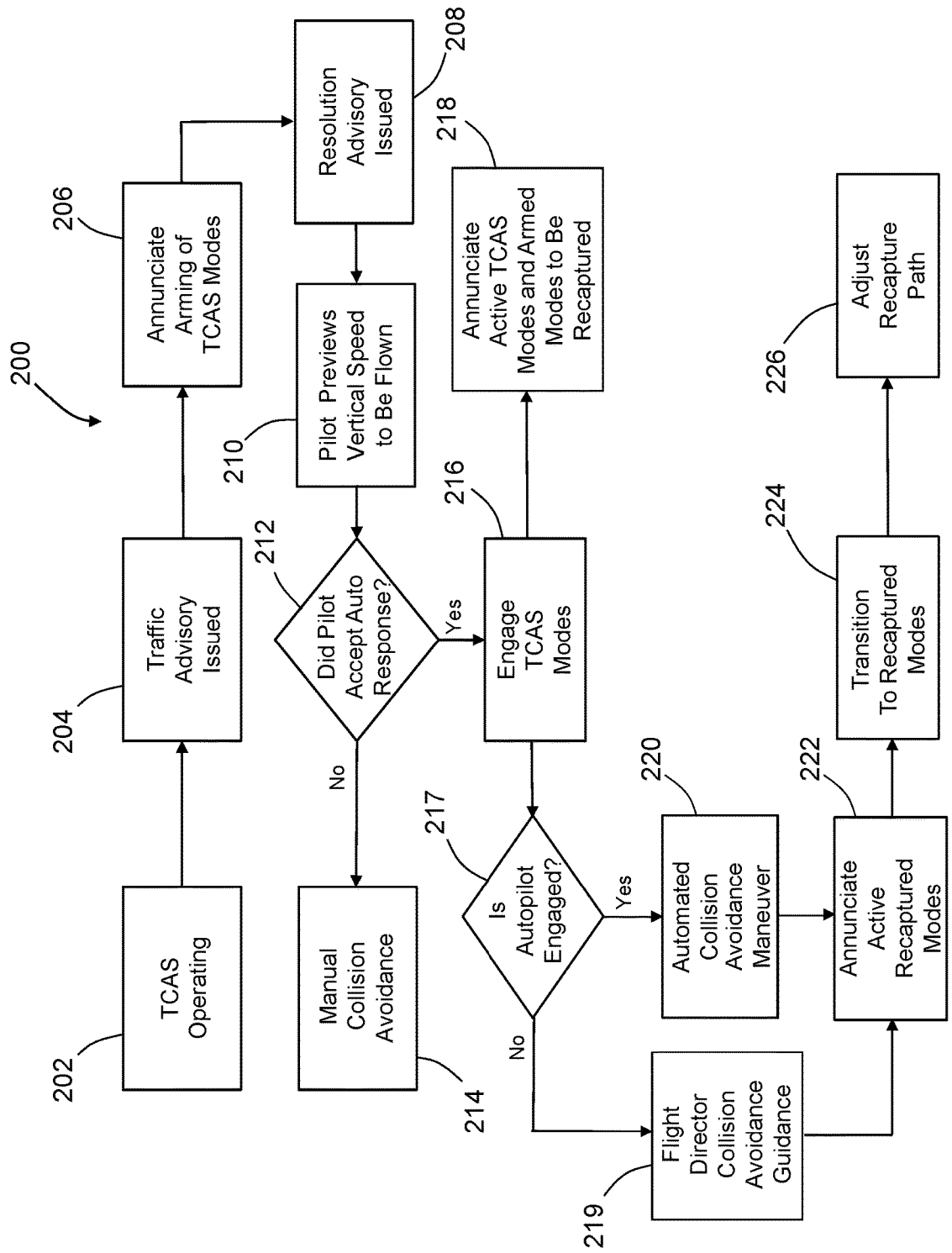
FIG. 15 is a flowchart identifying some steps of a methodology for enabling a pilot to preview and accept an automated response to a Resolution Advisory in accordance with one embodiment.

FIG. 15 is a flowchart identifying some steps of a method 200 for enabling a pilot to preview and accept an automated response to a Resolution Advisory in accordance with one embodiment. Prior to the issuance of an alert, the system for enabling pilot authorization (acceptance) of an automated response to an alert is ready but not active while the TCAS is monitoring a protected volume of space surrounding own aircraft (step 202).

If the Traffic Advisory logic of the TCAS declares another aircraft to be an intruder, a Traffic Advisory is issued against that aircraft (step 204). In response to the issuance of the Traffic Advisory, the V/S TCAS autopilot mode and SPD TCAS autothrottle mode are armed as previously described. Arming of the V/S TCAS and SPD TCAS modes is visually annunciated on a cockpit display (e.g., the primary flight display 70 depicted in FIG. 4) (step 206). In addition, an aural annunciation "TRAFFIC, TRAFFIC" is generated.

The visual and aural annunciations provide an advance alert to the flight crew. At this stage, the TCAS does not provide any guidance to the pilot with respect to a possible maneuver to avoid a collision.

If the Resolution Advisory logic declares the intruder aircraft to be a threat, a Resolution Advisory is issued against that aircraft (step 208). The RA alert includes visual annunciations in the form of red text "TRAFFIC" and graphic depiction of "keep-out" zones on the attitude and vertical speed indicators of both pilots. The alert also includes an aural annunciation that summarizes the collision avoidance maneuver to be flown (e.g., "CLIMB, CLIMB" or "DESCEND, DESCEND"). The RA alert is accompanied by a display of information to enable the pilots to preview the vertical speed to be flown and any and all autoflight mode changes to be made if accepted by the pilot (step 210).

The system for enabling a pilot to select an automated response to a TCAS Resolution Advisory then determines whether the pilot has accepted the recommended automated response or not (step 212). On the one hand, if a determination is made in step 212 that the pilot has not accepted the recommended automated response (e.g., has not pushed the appropriate button), then the flight crew may respond to the RA alert by manually performing an appropriate collision avoidance maneuver (step 214). In accordance with one embodiment, the pilot may hand fly the collision avoidance maneuver. The collision avoidance maneuver is to climb or descend as needed to avoid the "keep-out" zones displayed on the attitude and vertical speed indicators. This generally results in a climb or descent of 1500 fpm, but occasionally can command level flight, a 2500-fpm climb or descent, or to maintain the current climb/descent rate. Pilots may overreact to this command, causing excess altitude change and potentially generating conflicts with other airplanes.

On the other hand, if a determination is made in step 212 that the pilot has accepted the recommended automated response (e.g., has pushed the appropriate button), then the armed TCAS autopilot and autothrottle modes are engaged (become active) (step 216). In response to activation of the TCAS autopilot and autothrottle modes, the primary flight display (or other cockpit display) visually annunciates the active TCAS modes and the armed modes to recapture the flight path when the RA event ends (step 218).

In addition, a determination is made whether the autopilot is engaged or not (step 217). If the autopilot is engaged, it will transition to the vertical speed (V/S TCAS) mode at the previewed value of the vertical speed parameter. If the autothrottle is engaged, it transitions to the speed (SPD TCAS) mode. Under the control of the autopilot and autothrottle, the aircraft then performs the collision avoidance maneuver (step 220).

If only the flight director is engaged, it will also transition to vertical speed (V/S TCAS) and provide appropriate guidance for the pilot to follow the previewed value of the vertical speed parameter (step 219). If the autothrottle is not engaged, then the pilot must manually control airspeed.

Upon completion of the collision avoidance maneuver, the aural annunciator issues a "CLEAR OF CONFLICT" message and the primary flight display visually annunciates the active modes for recapture of the flight path (step 222). Also the red text "TRAFFIC" and the "keep-out" zones disappear from the display screen. In addition, the autopilot, autothrottle and flight director transition from the TCAS modes to the armed recapture flight path modes (step 224). The flight crew adjusts the recapture path as needed via the mode control panel or manually (step 226).

If the pilot did not accept the new TCAS maneuver, then once it clears (or was suppressed), the autopilot mode stays as it was and the new annunciations are cleared.

Figure 16:
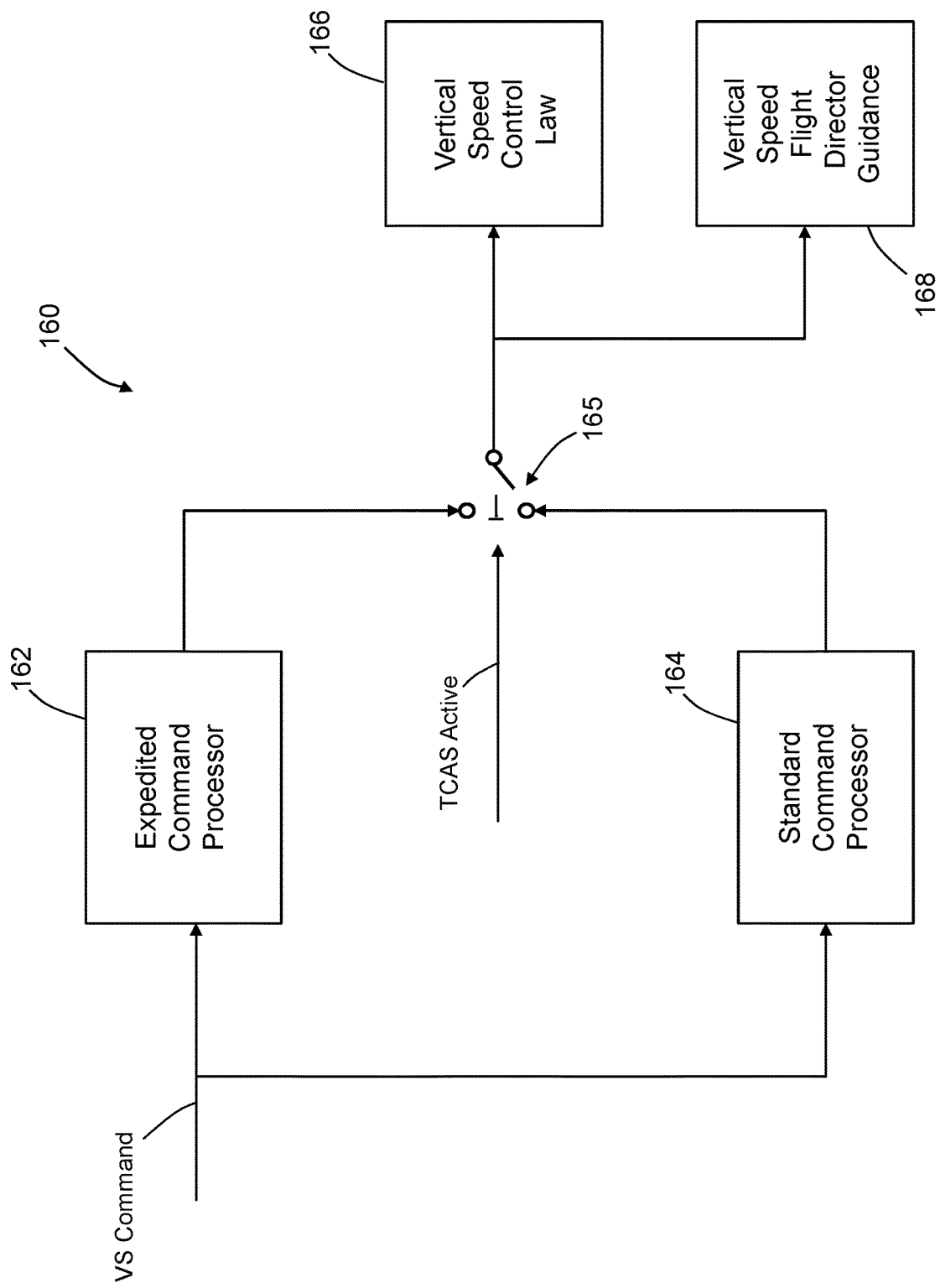
FIG. 16 is a block diagram identifying some components of an autopilot/flight director system in accordance with one embodiment having a faster response time.

FIG. 16 is a block diagram identifying some components of an autopilot/flight director system 160 in accordance with one embodiment that enables a faster response time. Typically input signal conditioning is applied to input commands by a standard command processor 164. The input commands are filtered or limited to achieve desired rate and acceleration characteristics. The autopilot/flight director system 160 further includes an expedited command process 162 in which the input signal is modified to provide a more prompt response and a wider range of operation than the response provided by the standard command processor 164. In response to receipt of the TCAS Active signal, a switch 165 changes from a pre-TA state in which conditioned inputs from the standard command processor 164 are provided to the vertical speed control law module 166 and to the vertical speed flight director guidance module 168 to a post-TA state in which conditioned inputs are provided by the expedited command processor 162.

Figure 17:
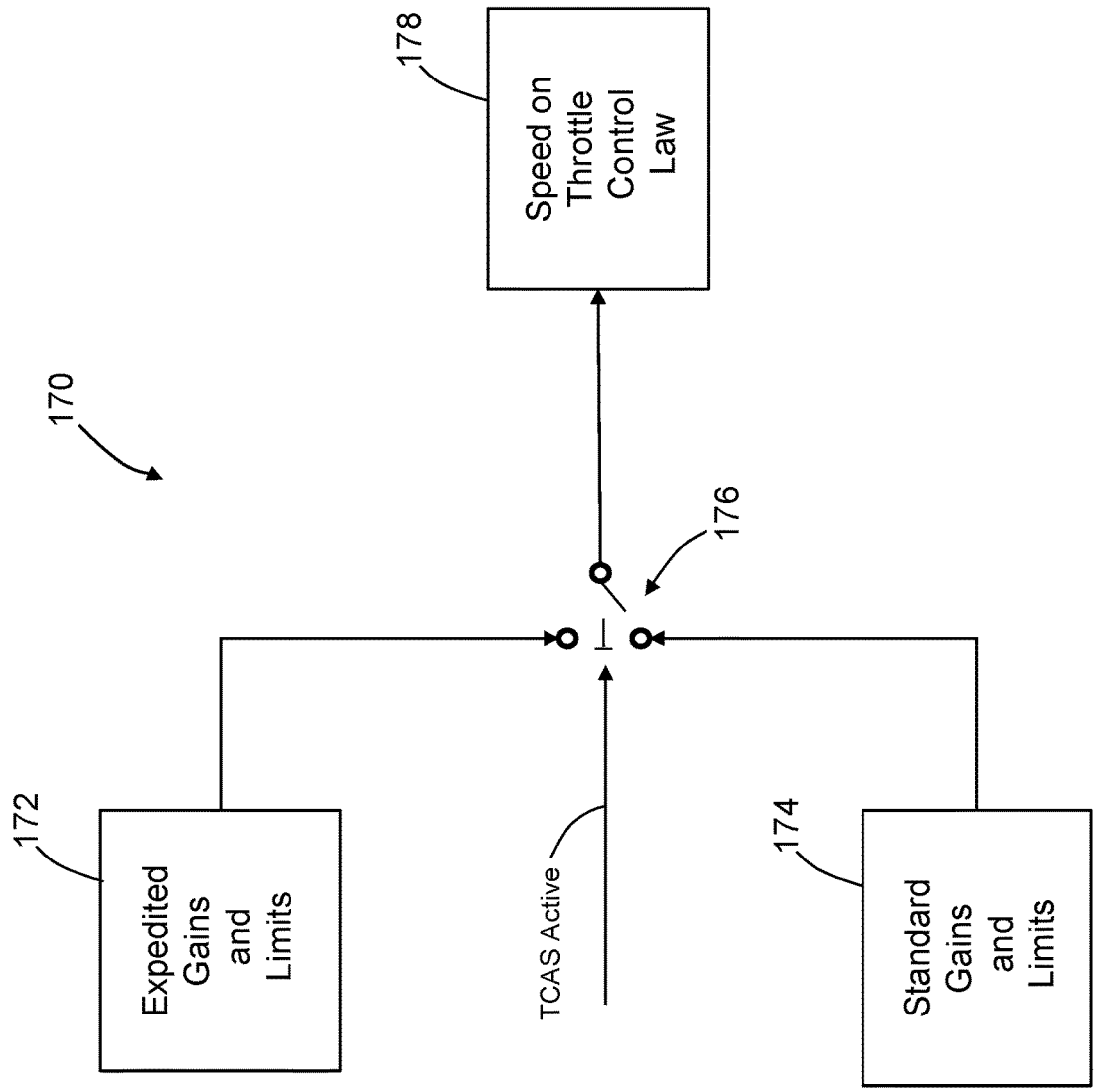
FIG. 17 is a block diagram identifying some components of an autothrottle control logic configuration in accordance with one embodiment that prioritizes climb performance over speed tracking.

FIG. 17 is a block diagram identifying some components of autothrottle control logic 170 which is configured to allow a wider range of allowable operation in the event of a TCAS Resolution Advisory in order to prioritize climb performance over speed tracking. In response to receipt of the TCAS Active signal, a switch 176 changes from a pre-TA state in which conditioned inputs from a standard gains and limits module 174 are provided to the speed on throttle control law module 178 to a post-TA state in which conditioned inputs are provided by the expedited gains and limits module 172.

A range of input methods are provided for the pilot to accept a mode change. The means for manually accepting a mode change may be a new button or linked to an existing button such as a vertical speed engage button on the mode control panel. An optional additional input to bypass pilot accept action and configure the collision avoidance system to be fully automated may be provided. The pilot may elect to engage the automation or flight director into the vertical speed mode to follow the guidance with the autothrottle configured for speed control by throttles. This can allow a unique configuration of the autothrottle control to support prioritization of the vertical speed pitch task. This allows a smooth and correct trajectory to be followed by the automation.

While systems and methods for enabling a pilot to preview vertical speed guidance following an air traffic conflict alert have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used herein, the term "computer system" should be construed broadly to encompass a system having at least one computer or processor, and which may have multiple computers or processors that are communicatively coupled via a network (wired or wireless) or bus. As used in the preceding sentence, the terms "computer" and "processor" both refer to devices comprising a processing unit (e.g., a central processing unit) and some form of memory (e.g., a non-transitory tangible computer-readable storage medium) for storing a program which is executable by the processing unit. For example, TCAS computer 12, mode control panel 14, display computer 16, autopilot/flight director computer 20, autothrottle 22 and FADEC 8 may be communicatively coupled in the manner depicted in FIG. 2 to form a "computer system" onboard the aircraft. The same components may be further grouped to form first and second computer systems which are communicatively coupled to each other (e.g., via a communication channel that couples an autopilot to an autothrottle) and which receive coordinated commands from a third computer system (e.g., TCAS computer 12).

To the extent that the original claims appended hereto or amended claims submitted later recite means for visually or aurally annunciating, the structure corresponding to "means for visually annunciating" includes a cockpit display (such as a primary flight display) configured to present symbology, a display window on a flight control panel (such as a mode control panel) and structural equivalents thereof; whereas the structure corresponding to "means for aurally annunciating" includes a speaker (e.g., a computer speaker) and structural equivalents thereof. Consequently, the structure corresponding to "means for annunciating" includes a cockpit display (such as a primary flight display) configured to present symbology, a display window on a flight control panel (such as a mode control panel), a speaker (e.g., a computer speaker) and structural equivalents thereof.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for enabling a pilot to preview vertical speed guidance following an air traffic conflict alert, the method comprising:
   (a) a TCAS computer onboard an aircraft determines that an intruder aircraft is within a protected airspace and then issues first air traffic conflict alert;
   (b) generating a first annunciation that is observable by a pilot and indicates that the first air traffic conflict alert has been issued;
   (c) an autopilot/flight director computer onboard the aircraft transitions to an armed mode in response to issuance of the first air traffic conflict alert;
   (d) the TCAS computer determines that a time to a closest approach of the intruder aircraft is below a threshold value and then issues a second air traffic conflict alert that includes vertical speed guidance which is calculated to avoid a collision;
   (e) generating a second annunciation that is observable by the pilot and indicates that the second air traffic conflict alert has been issued;
   (f) generating a third annunciation that indicates a commanded parameter value included in the vertical speed guidance for avoiding the collision;
   (g) receiving an input signal from the pilot indicating that the pilot has accepted the vertical speed guidance;
   (h) the autopilot/flight director computer transitions from the armed mode to an engaged mode in response to receipt of the input signal; and
   (i) controlling the aircraft to fly a collision avoidance maneuver that follows the vertical speed guidance while the autopilot/flight director computer is in the engaged mode.

2. The method as recited in claim 1, wherein step (i) comprises the autopilot/flight director computer provides guidance signals to a flight control computer to control the aircraft to fly the collision avoidance maneuver in accordance with the vertical speed guidance.

3. The method as recited in claim 2, further comprising generating a fourth annunciation that is observable by a pilot subsequent to step (h) and indicates that the autopilot/flight director computer has transitioned from the armed mode to the engaged mode.

4. The method as recited in claim 2, further comprising generating a fourth annunciation that is observable by a pilot subsequent to step (h) and indicates that an autothrottle mode for controlling the aircraft to fly the collision avoidance maneuver has been activated.

5. The method as recited in claim 2, wherein the input signal from the pilot is received before step (a).

6. The method as recited in claim 1, wherein the input signal selects a flight director mode of the autopilot/flight director computer and step (i) comprises manually controlling the aircraft to fly the collision avoidance maneuver in accordance with vertical speed guidance provided by the flight director.

7. The method as recited in claim 1, wherein the first and second annunciations are presented in a flight mode annunciator on a display and the third annunciation is superimposed on a vertical speed indicator on the display.

8. The method as recited in claim 1, wherein the second and third annunciations are presented in a window on a flight control panel.

9. The method as recited in claim 1, wherein the commanded parameter value is a commanded vertical speed.

10. The method as recited in claim 1, wherein the input signal from the pilot is received after step (f).

11. The method as recited in claim 1, wherein the first air traffic conflict alert is a Traffic Advisory and the second air traffic conflict alert is a Resolution Advisory.

12. The method as recited in claim 1, further comprising generating a fourth annunciation that is observable by the pilot and indicates that a speed mode of an autothrottle is in an armed mode.

13. The method as recited in claim 1, further comprising generating a fourth fifth annunciation that is observable by the pilot and indicates a previous mode of the autopilot/flight director computer that will be recaptured upon completion of the collision avoidance maneuver.

14. A system onboard an aircraft for enabling a pilot to preview vertical speed guidance following an air traffic conflict alert, the system comprising:
   a manually operable switch accessible to a pilot;
   means for annunciating visual or aural indications which are perceptible to the pilot; and
   a computer system configured to perform operations comprising:
      (a) determining that an intruder aircraft is within a protected airspace and then issuing a first air traffic conflict alert;

(b) activating the means for annunciating to generate a first annunciation that indicates that the first air traffic conflict alert has been issued;
(c) transitioning to an armed mode in response to issuance of the first air traffic conflict alert;
(d) determining that a time to a closest approach of the intruder aircraft is below a threshold value and then issuing a second air traffic conflict alert that includes vertical speed guidance for avoiding a collision;
(e) activating the means for annunciating to generate a second annunciation that is observable by a pilot and indicates that the second air traffic conflict alert has been issued;
(f) activating the means for annunciating to generate a third annunciation that is observable by the pilot and indicates a commanded parameter value included in the vertical speed guidance for avoiding the collision;
(g) receiving an input signal from the manually operable switch indicating that the pilot has accepted the vertical speed guidance; and
(h) transitioning from the armed mode to an engaged mode in response to receipt of the input signal.

15. The system as recited in claim 14, wherein the input signal authorizes an automated response and the computer system comprises an autopilot and an autothrottle configured to control the aircraft to fly the collision avoidance maneuver in accordance with the vertical speed guidance.

16. The system as recited in claim 15, further comprising means for annunciating a fourth annunciation that indicates the transition from the armed mode to the engaged mode has occurred.

17. The system as recited in claim 15, further comprising means for annunciating a fourth annunciation that indicates that an autothrottle mode for controlling the aircraft to fly the collision avoidance maneuver has been activated.

18. The system as recited in claim 15, further comprising an operator-selectable software option that governs whether the automated response will be executed automatically or only upon receipt of pilot acceptance.

19. The system as recited in claim 14, wherein the input signal selects a flight director mode and the computer system comprises a flight director configured to provide vertical speed guidance for enabling the pilot to manually control the aircraft to fly the collision avoidance maneuver.

20. The system as recited in claim 14, wherein the means for annunciating comprise a display configured to present the first and second annunciations in a flight mode annunciator and the third annunciation on a vertical speed indicator.

21. The system as recited in claim 14, further comprising a flight control panel, wherein the manually operable switch is part of the flight control panel and the second and third annunciations are presented in a window on the flight control panel.

22. The system as recited in claim 14, wherein the computer system comprises an autopilot/flight director system that includes an expedited command process in which an input signal is modified to provide an expedited response and a wider range of operation.

23. The system as recited in claim 14, wherein the computer system comprises autothrottle control logic which is configured to allow a wider range of allowable operation in response to the air traffic conflict alert.

24. An aircraft comprising:
at least one engine;
a plurality of control surfaces;
a manually operable switch accessible to a pilot;
means for annunciating visual or aural indications which are perceptible to the pilot; and
a computer system configured to perform operations comprising:
(a) determining that an intruder aircraft is within a protected airspace and then issuing a first air traffic conflict alert;
(b) activating the means for annunciating to generate a first annunciation that indicates that the first air traffic conflict alert has been issued;
(c) transitioning to an armed mode in response to issuance of the first air traffic conflict alert;
(d) determining that a time to a closest approach of the intruder aircraft is below a threshold value and then issuing a second air traffic conflict alert that includes vertical speed guidance for avoiding a collision;
(e) activating the means for annunciating to generate a second annunciation that is observable by a pilot and indicates that the second air traffic conflict alert has been issued;
(f) activating the means for annunciating to generate a third annunciation that is observable by the pilot and indicates a commanded parameter value included in the vertical speed guidance for avoiding the collision;
(g) receiving an input signal from the manually operable switch indicating that the pilot has accepted the vertical speed guidance; and
(h) transitioning from the armed mode to an engaged mode in response to receipt of the input signal.

25. The aircraft as recited in claim 24, wherein the input signal authorizes an automated response and the computer system comprises an autopilot and an autothrottle configured to controlling the at least one engine and the control surfaces so that the aircraft performs the collision avoidance maneuver in accordance with the vertical speed guidance.

26. The aircraft as recited in claim 24, wherein the input signal selects a flight director mode and the computer system comprises a flight director configured to provide vertical speed guidance for enabling the pilot to manually control the at least one engine and the control surfaces so that the aircraft performs the collision avoidance maneuver.

* * * * *